(12) United States Patent
Toshimitsu et al.

(10) Patent No.: US 9,785,138 B2
(45) Date of Patent: *Oct. 10, 2017

(54) ROBOT AND ROBOT CONTROLLER

(71) Applicant: Seiko Epson Corporation, Tokyo (JP)

(72) Inventors: Shunsuke Toshimitsu, Azumino (JP); Hiroaki Fujimori, Suwa (JP); Katsuji Igarashi, Chino (JP); Masatoshi Ono, Matsumoto (JP); Atsushi Asada, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,471

(22) Filed: Feb. 16, 2016

(65) Prior Publication Data

US 2016/0161937 A1 Jun. 9, 2016

Related U.S. Application Data

(63) Continuation of application No. 14/164,718, filed on Jan. 27, 2014, now Pat. No. 9,298,179.

(30) Foreign Application Priority Data

Jan. 28, 2013 (JP) ................. 2013-012949

(51) Int. Cl.
*G05B 19/18* (2006.01)
*G05B 19/04* (2006.01)
*G05B 19/19* (2006.01)

(52) U.S. Cl.
CPC .... *G05B 19/19* (2013.01); *G05B 2219/42114* (2013.01)

(58) Field of Classification Search
CPC ...... B25J 9/1641; B25J 9/1651; B25J 9/1628; B25J 9/1633; B25J 9/1638; B25J 9/1646; B25J 9/1653; B25J 9/1692; G05B 19/232; G05B 19/237; G05B 19/253; G05B 19/258; G05B 19/293; G05B 19/298
(Continued)

(56) References Cited

U.S. PATENT DOCUMENTS 4,403,281 A * 9/1983 Holmes .................... B25J 9/161
                                                            318/568.18
4,567,418 A * 1/1986 Takemoto ................ B25J 9/042
                                                            118/109
(Continued)

FOREIGN PATENT DOCUMENTS

JP    04-286003      10/1992
JP    04-315205 A    11/1992
JP    2008-194760 A   8/2008

*Primary Examiner* — Khoi Tran
*Assistant Examiner* — Jorge Peche
(74) *Attorney, Agent, or Firm* — Harness, Dickey & Pierce, P.L.C.

(57) ABSTRACT

A robot has an operation mode setting unit that sets an operation mode of the robot. The operation mode setting unit changes a correction factor multiplied by the maximum acceleration and the maximum deceleration of an arm and the servo gain of a servo circuit, and thereby selectively sets the operation mode to one of a first operation mode, a second operation mode in which the arm operates faster than in the first operation mode, and a third operation mode in which the arm vibrates less than in the first operation mode.

6 Claims, 11 Drawing Sheets

(58) Field of Classification Search
USPC ...... 700/253, 254, 245, 258, 260; 901/16, 9, 901/36, 46
See application file for complete search history.

(56) References Cited

U.S. PATENT DOCUMENTS

| | | | | |
|---|---|---|---|---|
| 4,631,464 A * | 12/1986 | Kato | ............... | B25J 19/06 318/565 |
| 4,794,312 A * | 12/1988 | Kano | ............... | G05B 19/237 318/599 |
| 4,801,856 A * | 1/1989 | Wajima | ............... | G05B 19/416 318/364 |
| 5,331,264 A * | 7/1994 | Cheng | ............... | G05B 19/416 318/560 |
| 5,594,309 A * | 1/1997 | McConnell | ............... | B25J 9/163 318/568.2 |
| 6,086,321 A * | 7/2000 | Takahashi | ............... | B25J 9/1612 414/793 |
| 6,189,404 B1 * | 2/2001 | Hatake | ............... | B25J 9/107 310/103 |
| 6,272,763 B1 * | 8/2001 | Yamaguchi | ............... | F16F 15/02 33/1 M |
| 2001/0056324 A1 * | 12/2001 | Miyazawa | ............... | B25J 9/1651 318/568.11 |
| 2003/0218440 A1 * | 11/2003 | Eloundou | ............... | G05B 19/401 318/460 |
| 2010/0104388 A1 * | 4/2010 | Suzuki | ............... | B23Q 11/0039 409/131 |
| 2010/0318223 A1 * | 12/2010 | Motoyoshi | ............... | B25J 9/1638 700/253 |
| 2011/0004343 A1 * | 1/2011 | Iida | ............... | B25J 9/1638 700/253 |
| 2011/0204838 A1 * | 8/2011 | Nakasugi | ............... | B25J 9/1633 318/689 |
| 2012/0101624 A1 * | 4/2012 | Ueno | ............... | B23Q 17/0976 700/173 |
| 2012/0179294 A1 * | 7/2012 | Sasai | ............... | B25J 9/1694 700/254 |
| 2012/0215357 A1 * | 8/2012 | Igarashi | ............... | B25J 9/1641 700/258 |
| 2012/0239198 A1 * | 9/2012 | Orita | ............... | B25J 9/1641 700/260 |
| 2012/0253708 A1 * | 10/2012 | Tanaka | ............... | B23Q 11/0039 702/56 |
| 2012/0296472 A1 * | 11/2012 | Nagai | ............... | B25J 9/1612 700/258 |
| 2013/0046405 A1 * | 2/2013 | Shamoto | ............... | G05B 19/404 700/190 |
| 2013/0190926 A1 * | 7/2013 | Motoyoshi | ............... | B25J 9/1653 700/254 |
| 2013/0200835 A1 * | 8/2013 | Sekiguchi | ............... | G05B 19/404 318/490 |

* cited by examiner

ROBOT AND ROBOT CONTROLLER

CROSS-REFERENCE TO RELATED APPLICATIONS

This is a continuation patent application of U.S. application Ser. No. 14/164,718, filed Jan. 27, 2014, which claims priority to Japanese Patent Application No. 2013-012949, filed Jan. 28, 2013, both of which are expressly incorporated by reference herein in their entireties.

BACKGROUND

1. Technical Field

The present invention relates to a robot and a robot controller.

2. Related Art

Robots having rotatable arms and working with freedom in three-dimensional spaces have been known. There has been a demand for such robots to operate in industrial settings at a high speed with improved work efficiency during routine operations and, on the other hand, to have suppressed vibrations during performance of delicate work (precise work) so the robot can perform precisely.

Accordingly, robots that may select a standard mode in which the robot operates at a standard speed and a fast mode in which the robot operates at a high speed as operation modes of the robot have been proposed (for example, see Patent JP-A-4-286003. Note that, when the mode is changed between the standard mode and the fast mode, the servo gain of a servo circuit controlling the operation of the robot is changed.

However, in robots of the related art, it is necessary to change the servo gain in response to the attitude of the robot. To do this, it is necessary to stop the robot, change the servo gain, and then activate the robot again. Accordingly, there has been a problem of poor work efficiency. Further, the anticipated vibration suppression may not always be obtained depending on the shapes and loads of the tools attached to the robot.

SUMMARY

An advantage of some aspects of the invention is to provide a robot and a robot controller that may operate as a high-speed-specialized type, a vibration-suppression-specialized type at deactivation, and a compatible type that ensures compatibility between high-speed performance and vibration-suppression at deactivation with a single robot and are hardly affected by shapes and loads of tools by turning of servo gain using an angular velocity sensor.

A robot according to an aspect of the invention includes a rotatable arm, a drive source that rotates the arm, an angular velocity sensor provided in the arm, a position sensor that detects a rotation angle of the drive source, a servo circuit that performs vibration suppression control based on a detection result of the angular velocity sensor, and an operation mode setting unit that sets an operation mode, wherein the operation mode setting unit changes a correction factor multiplied by the maximum acceleration and the maximum deceleration of the arm and servo gain of the servo circuit, and thereby, selectively sets three operation modes of a first operation mode, a second operation mode in which the arm operates faster than that in the first operation mode, and a third operation mode in which the arm vibrates less than that in the first operation mode.

Thereby, the single robot may operate as the high-speed-specialized type that may shorten the time to reach a target position, the vibration-suppression-specialized type at deactivation that may reduce the vibration when the operation is stopped, and the compatible type that ensures compatibility between high-speed performance and vibration-suppression at deactivation.

Further, the vibration of the robot in operation may be suppressed.

In the robot according to the aspect of the invention, it is preferable that the servo circuit controls operation of the drive source based on detection results of the angular velocity sensor and the position sensor, in the second operation mode, the maximum acceleration of the arm is set to be 1 to 2 times that in the first operation mode, the maximum deceleration of the arm is set to be 1 to 2 times that in the first operation mode, the correction factor is set to be 0.5 to 2.5 times that in the first operation mode, the servo gain is set to be equal to that in the first operation mode, and a cycle time as a time taken when the arm performs a predetermined test operation is 90% or less than that in the first operation mode, and, in the third operation mode, the maximum acceleration of the arm is set to be 0.5 to 1.5 times that in the first operation mode, the maximum deceleration of the arm is set to be 0.5 to 1.5 times that in the first operation mode, the correction factor is set to be 0.5 to 1.5 times that in the first operation mode, the servo gain is set to be 0.5 to 1.5 times that in the first operation mode, and, when the arm performs predetermined test operation and is displaced to a target position, an excessive amount of passage from position as an amount of shift when the arm first passes the target position and shifts from the target position is 0.5 times or less than that in the first operation mode or 30 μm or less.

Thereby, the servo gain is equal between the second operation mode and the first operation mode, and thus, even in the operation of the robot, the mode may be changed from the second operation mode to the first operation mode and from the first operation mode to the second operation mode. Thereby, the work efficiency may be improved.

In the robot according to the aspect of the invention, it is preferable that the maximum acceleration and the maximum deceleration of the arm in the second operation mode are respectively larger than those in the first operation mode.

Thereby, the time to reach the target position may be made even shorter.

In the robot according to the aspect of the invention, it is preferable that the correction factor in the second operation mode is larger than that in the first operation mode.

Thereby, the time to reach the target position may be made even shorter.

In the robot according to the aspect of the invention, it is preferable that the maximum speeds of the arm are equal between the second operation mode and the first operation mode.

Thereby, stable operation may be performed.

In the robot according to the aspect of the invention, it is preferable that a robot main body having the arm, the drive source, the angular velocity sensor, and the position sensor, a robot controller separately provided from the robot main body, having the servo circuit and the operation mode setting unit, and performing control of the robot main body, and a cable that connects the robot main body and the robot controller are provided.

Thereby, downsizing of the robot main body may be realized.

In the robot according to the aspect of the invention, it is preferable that a robot main body having the arm, the drive source, the angular velocity sensor, and the position sensor, and a robot controller built in the robot main body, having the servo circuit and the operation mode setting unit, and performing control of the robot main body are provided.

Thereby, the structure of the entire robot may be simplified.

In the robot according to the aspect of the invention, it is preferable that the servo circuit controls the drive source by feedback of a correction component derived from the detection results of the angular velocity sensor and the position sensor and has a function of setting the servo gain of the correction component to zero when the operation of the arm is stopped, and, in the third operation mode, when the operation of the arm is stopped, if the servo gain of the correction component is set to zero, the time to set the servo gain of the correction component to zero is earlier than that in the first operation mode.

Thereby, the vibration when the operation is stopped may be made even smaller.

In the robot according to the aspect of the invention, it is preferable that an arm connected body is provided having pluralities of the arms and the drive sources and rotatably connecting the adjacent arms of the plurality of arms, and the test operation at measurement of the cycle time is to reciprocate a distal end of the arm connected body at the maximum speeds, the maximum acceleration, and the maximum deceleration of the respective arms under a condition that a weight of 2 kg is held at the distal end of the arm connected body, and, in each of the first half and the second half in the reciprocation, a rising operation of moving the distal end of the arm connected body by 25 mm upwardly in a vertical direction, a horizontal moving operation of moving the end by 300 mm in a horizontal direction, and a falling operation of moving the end by 25 mm downwardly in the vertical direction are performed, and the rising operation and an initial part of the horizontal moving operation are performed at the same time and the falling operation and a terminal part of the horizontal moving operation are performed at the same time.

By specifying the cycle time, the time to reach the target position may be made shorter more reliably.

In the robot according to the aspect of the invention, it is preferable that an arm connected body is provided having pluralities of the arms and the drive sources and rotatably connecting the adjacent arms of the plurality of arms, and the test operation at measurement of the excessive amount of passage from position is to rotate the arm to 90° at the maximum speed, the maximum acceleration, and the maximum deceleration of the arm under a condition that a weight of 2 kg is held at a distal end of the arm connected body.

By specifying the excessive amount of passage from position, the vibration when the operation is stopped may be reliably made smaller.

A robot controller according to an aspect of the invention is a robot controller that performs control of a robot main body having a rotatable arm, a drive source that rotates the arm, an angular velocity sensor provided in the arm, and a position sensor that detects a rotation angle of the drive source, and includes a servo circuit that performs vibration suppression control based on a detection result of the angular velocity sensor, and an operation mode setting unit that sets an operation mode, wherein the operation mode setting unit changes a correction factor multiplied by the maximum acceleration and the maximum deceleration of the arm and servo gain of the servo circuit, and thereby, selectively sets three operation modes of a first operation mode, a second operation mode in which the arm operates faster than that in the first operation mode, and a third operation mode in which the arm vibrates less than that in the first operation mode.

Thereby, the single robot may operate as the high-speed-specialized type that may shorten the time to reach a target position, the vibration-suppression-specialized type at deactivation that may reduce the vibration when the operation is stopped, and the compatible type that ensures compatibility between high-speed performance and vibration-suppression at deactivation.

Further, the vibration of the robot in operation may be suppressed.

In the robot controller according to the aspect of the invention, it is preferable that the servo circuit controls operation of the drive source based on detection results of the angular velocity sensor and the position sensor, in the second operation mode, the maximum acceleration of the arm is set to be 1 to 2 times that in the first operation mode, the maximum deceleration of the arm is set to be 1 to 2 times that in the first operation mode, the correction factor is set to be 0.5 to 2.5 times that in the first operation mode, the servo gain is set to be equal to that in the first operation mode, and a cycle time as a time taken when the arm performs predetermined test operation is 90% or less than that in the first operation mode, and, in the third operation mode, the maximum acceleration of the arm is set to be 0.5 to 1.5 times that in the first operation mode, the maximum deceleration of the arm is set to be 0.5 to 1.5 times that in the first operation mode, the correction factor is set to be 0.5 to 1.5 times that in the first operation mode, the servo gain is set to be 0.5 to 1.5 times that in the first operation mode, and, when the arm performs predetermined test operation and is displaced to a target position, an excessive amount of passage from position as an amount of shift when the arm first passes the target position and shifts from the target position is 0.5 times or less than that in the first operation mode or 30 µm or less.

Thereby, the servo gain is equal between the second operation mode and the first operation mode, and thus, even in the operation of the robot, the mode may be changed from the second operation mode to the first operation mode and from the first operation mode to the second operation mode. Thereby, the work efficiency may be improved.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

A robot and a robot controller will be explained below in detail according to preferred embodiments shown in the accompanying drawings.

First Embodiment

Figure 1:
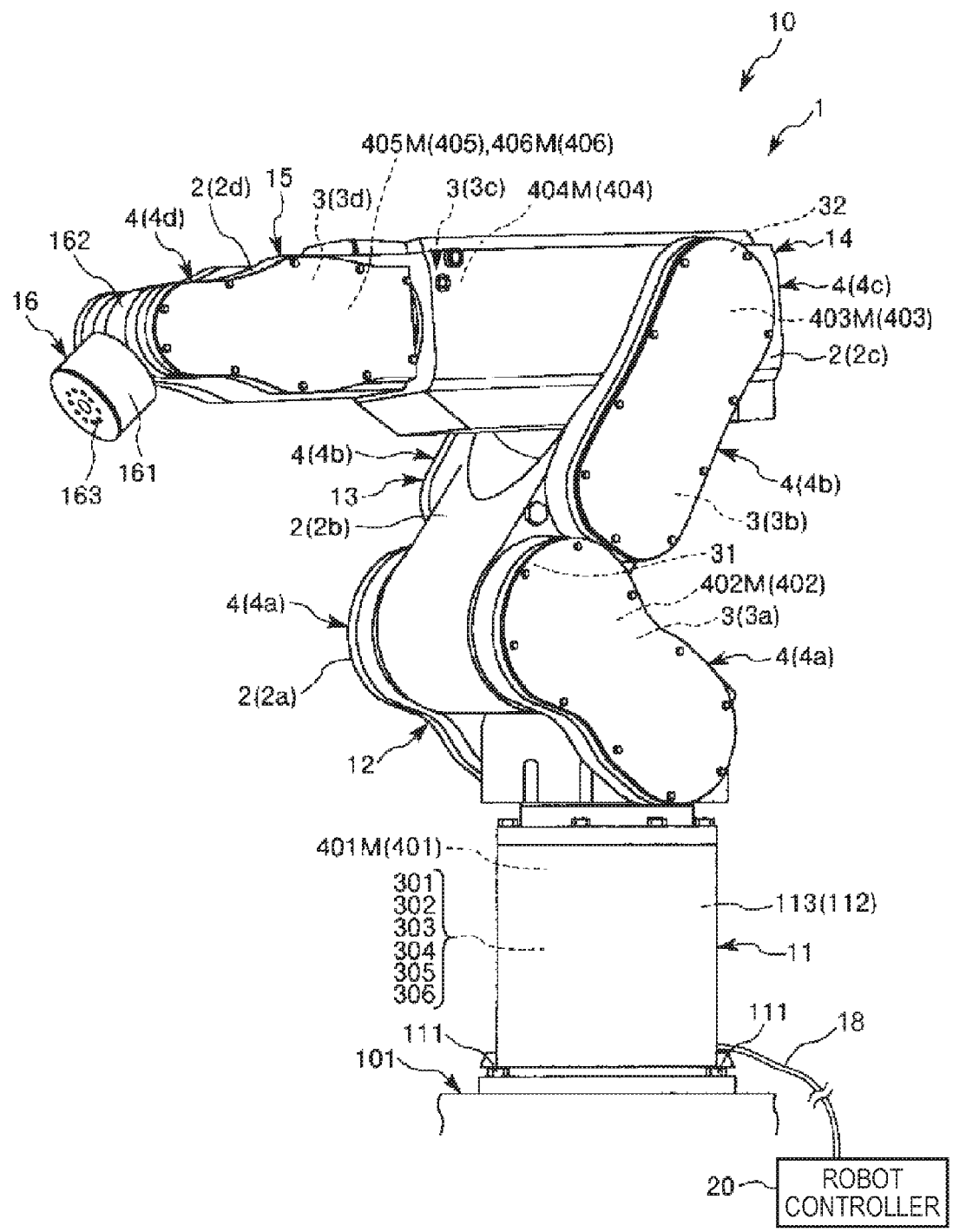
FIG. 1 is a perspective view of a robot of a first embodiment of the invention as seen from the front side.
Figure 2:
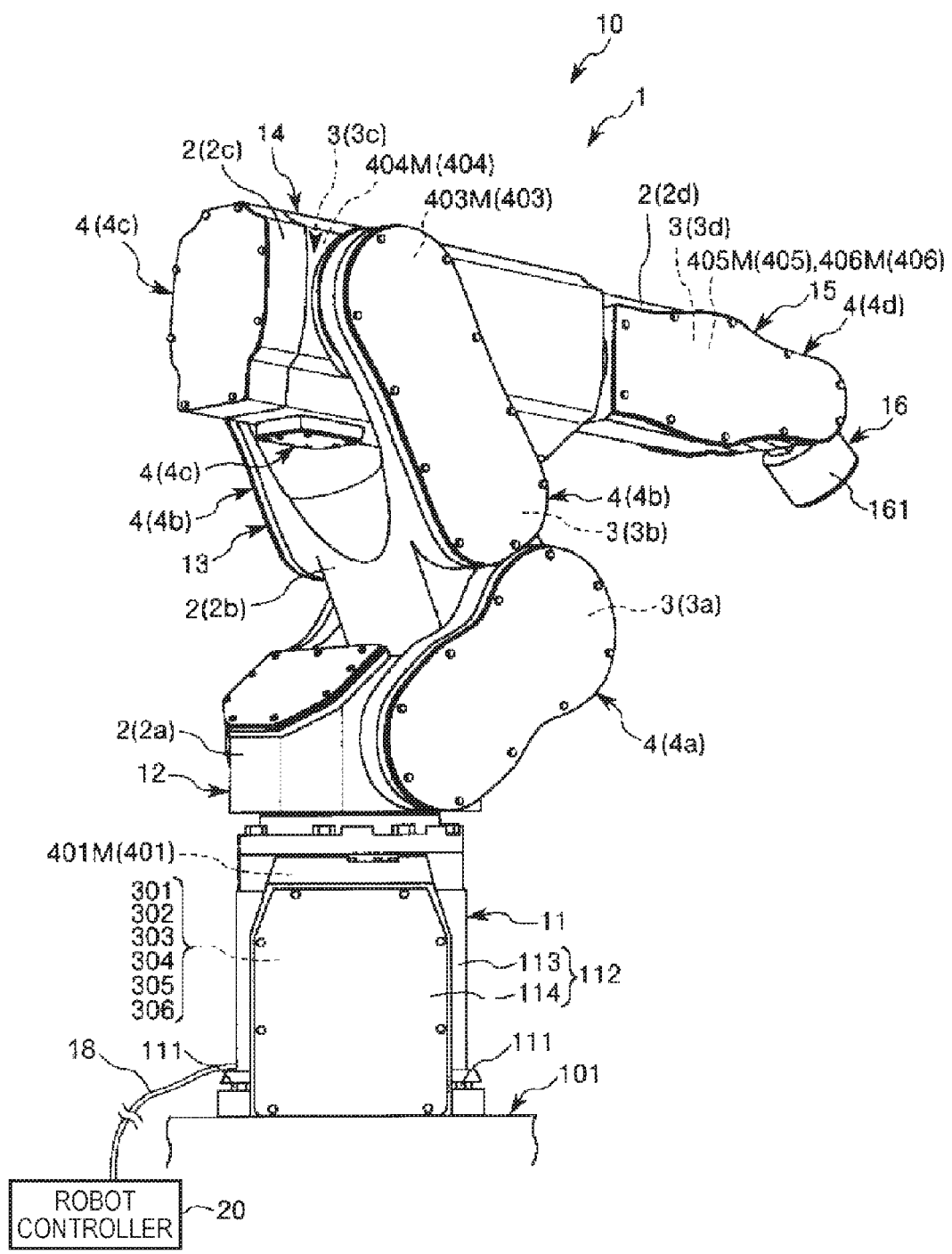
FIG. 2 is a perspective view of the robot shown in FIG. 1 as seen from the rear side.
Figure 3:
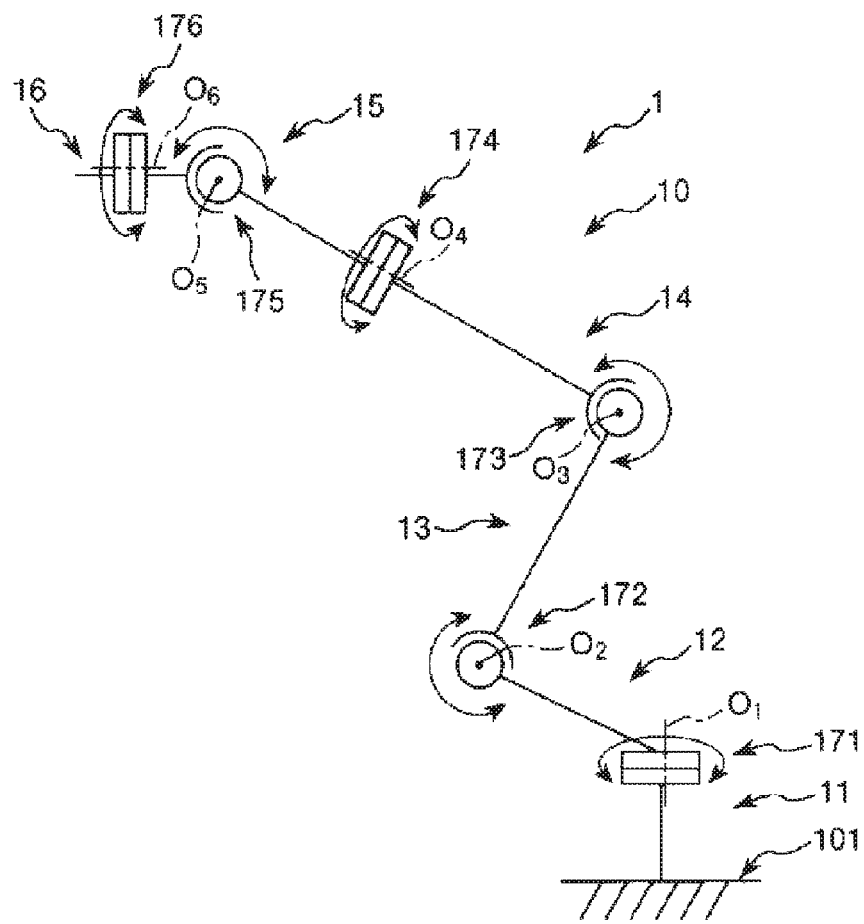
FIG. 3 is a schematic diagram of the robot shown in FIG. 1.
Figure 4:
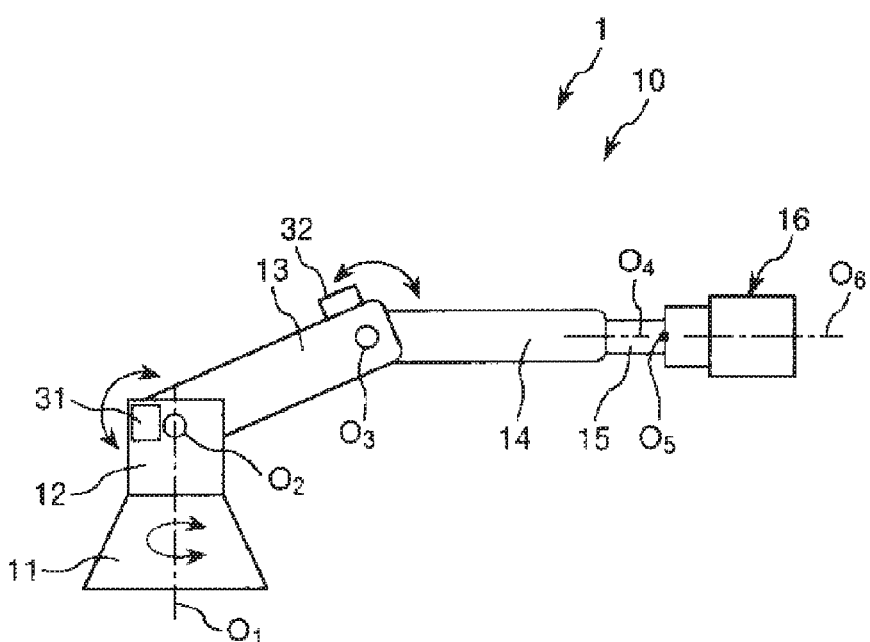
FIG. 4 is a schematic diagram of the robot shown in FIG. 1.
Figure 5:
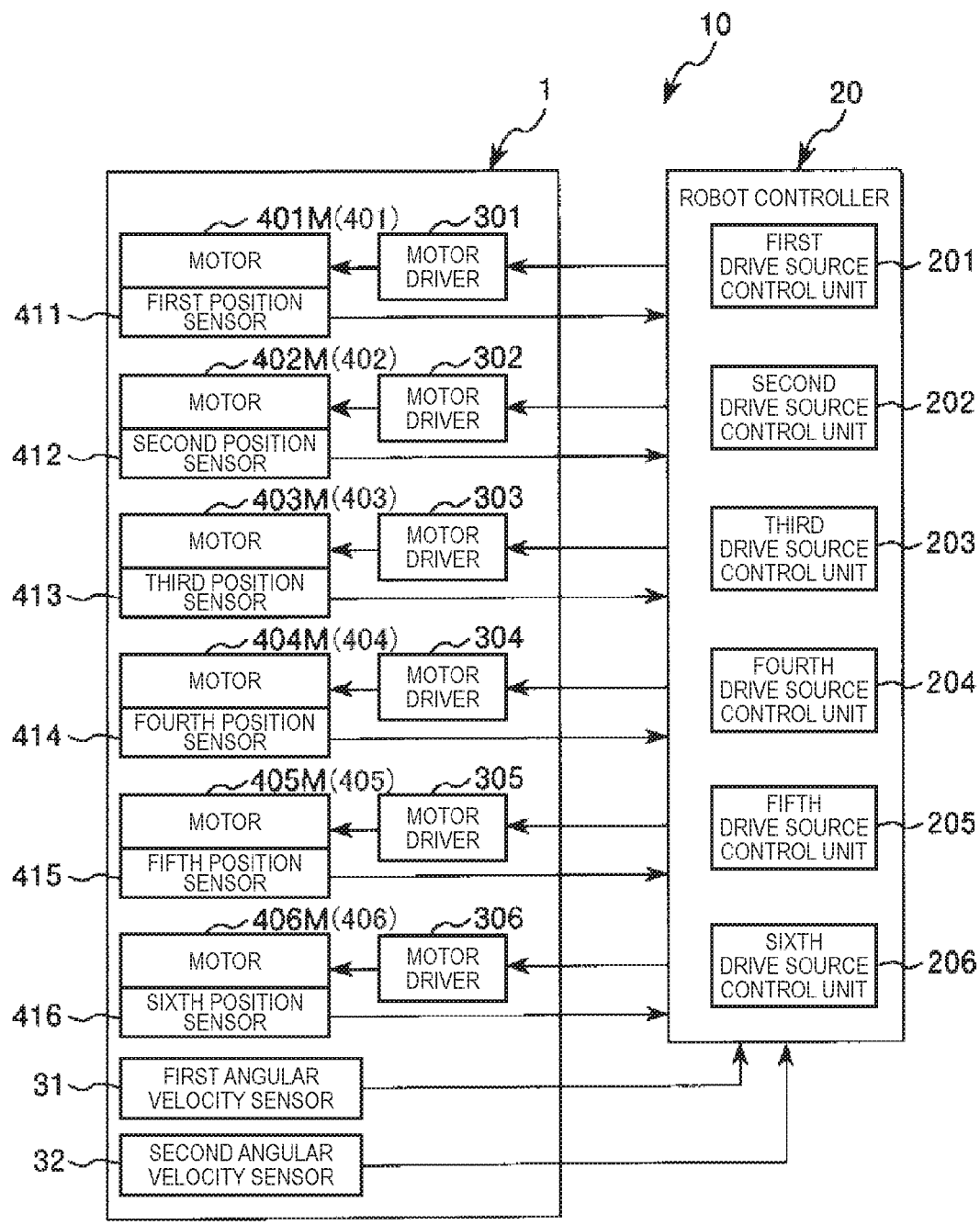
FIG. 5 is a block diagram of part of the robot shown in FIG. 1.
Figure 6:
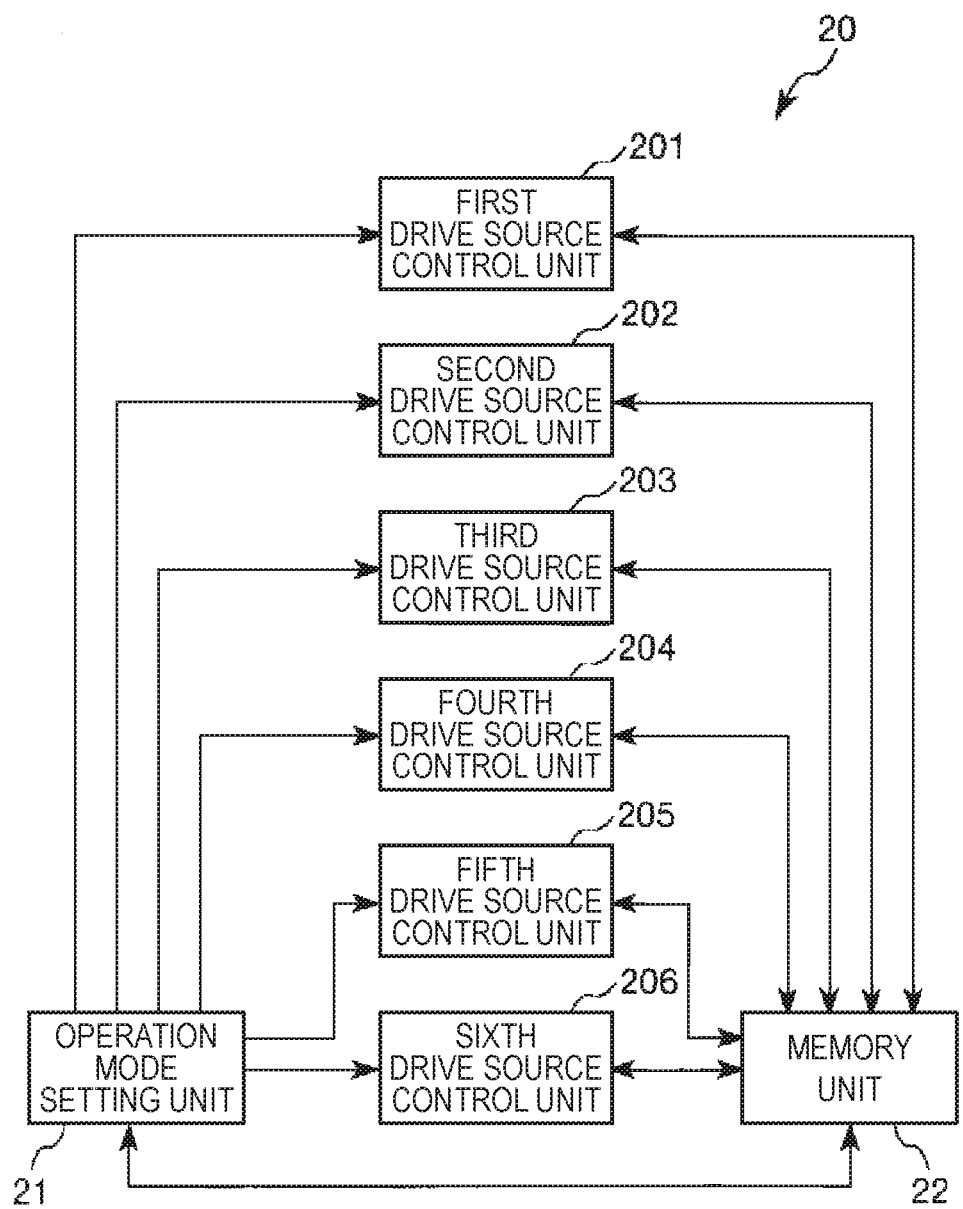
FIG. 6 is a block diagram of the part of the robot shown in FIG. 1.
Figure 7:
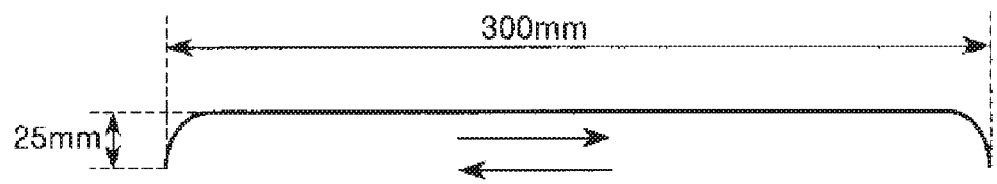
FIG. 7 is a diagram for explanation of a cycle time.
Figure 8:
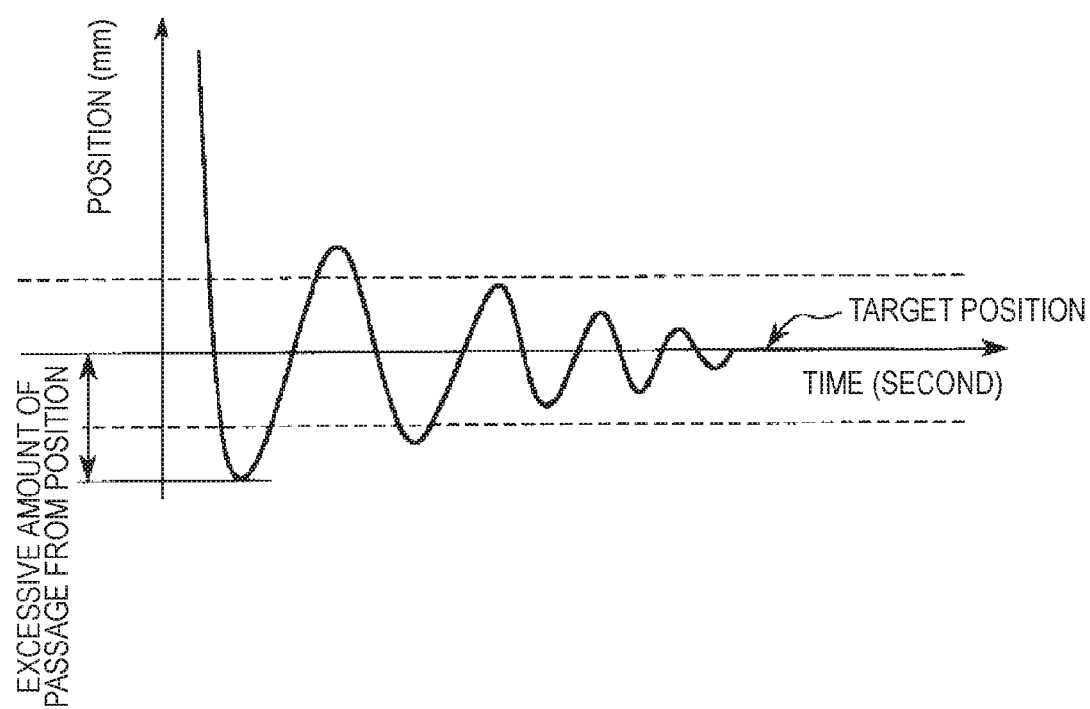
FIG. 8 is a diagram for explanation of an excessive amount of passage from position.

FIG. 1 is a perspective view of a robot of the first embodiment of the invention as seen from the front side. FIG. 2 is a perspective view of the robot shown in FIG. 1 as seen from the rear side. FIG. 3 is a schematic diagram of the robot shown in FIG. 1. FIG. 4 is a schematic diagram of the robot shown in FIG. 1. FIG. 5 is a block diagram of a part of robot shown in FIG. 1. FIG. 6 is a block diagram of the part of robot shown in FIG. 1. FIG. 7 is a diagram for explanation of a cycle time. FIG. 8 is a diagram for explanation of an excessive amount of passage from posit ion. FIGS. 9 to 14 are respectively block diagrams of the part of robot shown in FIG. 1.

Note that for convenience of explanation, the upside in FIGS. 1 to 4 is referred to as "upper" or "above" and the downside is referred to as "lower" or "below". Further, the base side in FIGS. 1 to 4 is referred to as "proximal end" and the opposite side is referred to as "distal end". Furthermore, in FIGS. 1 and 2, a robot controller 20 is shown by block diagrams, respectively. In FIG. 4, rotation shafts $O_2$, $O_3$ are respectively overdrawn. Further, in FIG. 4, angular velocity sensors 31, 32 are shown outside of arms 12, 13 for making their existence clear, respectively.

A robot (industrial robot) 1 shown in FIGS. 1 to 5 may be used in manufacturing processes of manufacturing precision equipment such as wristwatches, for example, and has a robot main body 10 and a robot controller 20 that controls operation of the robot main body 10 (robot 1). The robot main body 10 and the robot controller 20 are electrically connected by a cable 18. Further, the robot controller 20 may include a personal computer (PC) containing a CPU (Central Processing Unit) or the like. The robot controller 20 will be described later in detail.

The robot main body 10 includes a base 11, four arms (links) 12, 13, 14, 15, a wrist (link) 16, and six drive sources 401, 402, 403, 404, 405, 406. The arms 12, 13, 14, 15 and the wrist 16 form part of an arm connected body. The robot 1 is a vertical articulated (six-axis) robot (robot main body) in which the base 11, the arms 12, 13, 14, 15, and the wrist 16 are connected in this order from the proximal end toward the distal end. In the vertical articulated robot, the base 11, the arms 12 to 15, and the wrist 16 may be collectively referred to as "arm", and divisionally, the arm 12 may be referred to as "first arm", the arm 13 as "second arm", the arm 14 as "third arm", the arm 15 as "fourth arm", and the wrist 16 as "fifth arm, sixth arm". Note that, in the embodiment, the wrist 16 has the fifth arm and the sixth arm. An end effector or the like may be attached to the wrist 16.

The arms 12 to 15 and the wrist 16 are respectively supported to be independently displaceable with respect to the base 11. The lengths of the arms 12 to 15 and the wrist 16 are respectively not particularly limited. In the illustrated configuration, the lengths of the first arm 12, the second arm 13, and the third arm 14 are set to be longer than those of the fourth arm 15 and the wrist 16.

The base 11 and the first arm 12 are connected via a joint 171. Further, the first arm 12 is rotatable with a first rotation shaft $O_1$ parallel to the vertical direction as a rotation center around the first rotation shaft $O_1$ with respect to the base 11. The first rotation shaft $O_1$ is aligned with the normal line of the upper surface of a floor 101 as an installation surface of the base 11. The rotation around the first rotation shaft $O_1$ is made by driving of the first drive source 401 having a motor 401M. Further, the first drive source 401 is driven by the motor 401M and a cable (not shown) and the motor 401M is controlled by the robot controller 20 via a motor driver 301 electrically connected thereto (see FIG. 5). Note that the first drive source 401 may be adapted to transmit the drive force from the motor 401M by a reducer (not shown) provided with the motor 401M, or the reducer may be omitted. In the embodiment, the first drive source 401 has the reducer.

The first arm 12 and the second arm 13 are connected via a joint 172. Further, the second arm 13 is rotatable with a second rotation shaft $O_2$ parallel to the horizontal direction as an axis with respect to the first arm 12. The second rotation shaft $O_2$ is orthogonal to the first rotation shaft $O_1$. The rotation around the second rotation shaft $O_2$ is made by driving of the second drive source 402 having a motor 402M. Further, the second drive source 402 is driven by the motor 402M and a cable (not shown) and the motor 402M is controlled by the robot controller 20 via a motor driver 302 electrically connected thereto (see FIG. 5). Note that the second drive source 402 may be adapted to transmit the drive force from the motor 402M by a reducer (not shown) provided with the motor 402M, or the reducer may be omitted. In the embodiment, the second drive source 402 has the reducer. Further, the second rotation shaft $O_2$ may be parallel to the axis orthogonal to the first rotation shaft $O_1$.

The second arm 13 and the third arm 14 are connected via a joint 173. Further, the third arm 14 is rotatable with a third rotation shaft $O_3$ parallel to the horizontal direction as a rotation center around the third rotation shaft $O_3$ with respect to the second arm 13. The third rotation shaft $O_3$ is parallel to the second rotation shaft $O_2$. The rotation around the third rotation shaft $O_3$ is made by driving of the third drive source 403. Further, the third drive source 403 is driven by a motor 403M and a cable (not shown) and the motor 403M is controlled by the robot controller 20 via a motor driver 303 electrically connected thereto (see FIG. 5). Note that the third drive source 403 may be adapted to transmit the drive force from the motor 403M by a reducer (not shown) provided with the motor 403M, or the reducer may be omitted. In the embodiment, the third drive source 403 has the reducer.

The third arm 14 and the fourth arm 15 are connected via a joint 174. Further, the fourth arm 14 is rotatable with a fourth rotation shaft $O_4$ parallel to the center axis direction of the third arm 14 as a rotation center around the fourth rotation shaft $O_4$ with respect to the third arm 14 (base 11). The fourth rotation shaft $O_4$ is orthogonal to the third rotation shaft $O_3$. The rotation around the fourth rotation shaft $O_4$ is made by driving of the fourth drive source 404. Further, the fourth drive source 404 is driven by a motor 404M and a cable (not shown) and the motor 404M is controlled by the robot controller 20 via a motor driver 304 electrically connected thereto (see FIG. 5). Note that the fourth drive source 404 may be adapted to transmit the drive force from the motor 404M by a reducer (not shown) provided with the motor 404M, or the reducer may be omitted. In the embodiment, the fourth drive source 404 has the reducer. The fourth rotation shaft $O_4$ may be parallel to the axis orthogonal to the third rotation shaft $O_3$.

The fourth arm 15 and the wrist 16 are connected via a joint 175. Further, the wrist 16 is rotatable with a fifth rotation shaft $O_5$ parallel to the horizontal direction (y-axis direction) as a rotation center around the fifth rotation shaft $O_5$ with respect to the fourth arm 15. The fifth rotation shaft $O_5$ is orthogonal to the fourth rotation shaft $O_4$. The rotation around the fifth rotation shaft $O_5$ is made by driving of the fifth drive source 405. Further, the fifth drive source 405 is driven by a motor 405M and a cable (not shown) and the motor 405M is controlled by the robot controller 20 via a motor driver 305 electrically connected thereto (see FIG. 5). Note that the fifth drive source 405 may be adapted to transmit the drive force from the motor 405M by a reducer (not shown) provided with the motor 405M, or the reducer may be omitted. In the embodiment, the fifth drive source 405 has the reducer. Further, the wrist 16 is also rotatable with a sixth rotation shaft $O_6$ orthogonal to the fifth rotation shaft $O_6$ as a rotation center around the sixth rotation shaft $O_6$ via a joint 176. The sixth rotation shaft $O_6$ is orthogonal to the fifth rotation shaft $O_5$. The rotation around the sixth rotation shaft $O_6$ is made by driving of the sixth drive source 406. Further, the sixth drive source 406 is driven by a motor and a cable (not shown) and the motor 406M is controlled by the robot controller 20 via a motor driver 306 electrically connected thereto (see FIG. 5). Note that the sixth drive source 406 may be adapted to transmit the drive force from the motor 406M by a reducer (not shown) provided with the motor 406M, or the reducer may be omitted. In the embodiment, the sixth drive source 406 has the reducer. Further, the fifth rotation shaft $O_5$ may be parallel to the axis orthogonal to the fourth rotation shaft $O_4$, and the sixth rotation shaft $O_6$ may be parallel to the axis orthogonal to the fifth rotation shaft $O_5$.

The first angular velocity sensor 31 is provided in the first arm 12. The angular velocity around the first rotation shaft $O_1$ of the first arm 12 is detected by the first angular velocity sensor 31. The position where the first angular velocity sensor 31 is provided in the first arm 12 is not particularly limited, but is preferably at the distal end of the first arm 12. In the embodiment, the first angular velocity sensor 31 is provided at the distal end inside of the first arm 12. The vibration of the first arm 12 is the maximum in the distal end, and thereby, the vibration of the robot 1 may be suppressed more reliably. Note that the first angular velocity sensor 31 may be provided at the proximal end of the first arm 12, if desired.

Further, the second angular velocity sensor 32 is provided in the second arm 13. The angular velocity around the second rotation shaft $O_2$ of the second arm 13 is detected by the second angular velocity sensor 32. The position where the second angular velocity sensor 32 is provided in the second arm 13 is not particularly limited, but is preferably at the distal end of the second arm 13. In the embodiment, the second angular velocity sensor 32 is provided at the distal end inside of the second arm 13. The vibration of the second arm 13 is the maximum at the distal end, and thereby, the vibration of the robot 1 may be suppressed more reliably. Note that the second angular velocity sensor 32 may be provided at the proximal end of the second arm 13, if desired.

The first angular velocity sensor 31 and the second angular velocity sensor 32 are not particularly limited, but, for example, gyro sensors or the like may be used.

Here, in the robot 1, to suppress the vibrations of the first arm 12 and the second arm 13, the first angular velocity sensor 31 is provided in the first arm 12 and the operation of the first drive source 401 is controlled based on the detection result of the first angular velocity sensor 31, and the second angular velocity sensor 32 is provided in the second arm 13 and the operation of the second drive source 402 is controlled based on the detection result of the second angular velocity sensor 32. Thereby, the vibrations of the first arm 12 and the second arm 13 may be reliably suppressed, and the vibration of the entire robot 1 may be suppressed.

Note that major causes of the vibrations of the arms 12 to 15 and the wrist 16 of the robot 1 include distortion and deflection of the reducers and deflection of the arms 12 to 15 and the wrist 16, for example.

In the drive sources 401 to 406, a first position sensor 411, a second position sensor 412, a third position sensor 413, a fourth position sensor 414, a fifth position sensor 415, and a sixth position sensor 416 are provided on their motors or reducers, respectively. These position sensors are not particularly limited, but, for example, encoders, rotary encoders, resolvers, potentiometers, or the like may be respectively used. The rotation angles of the shaft parts of the motors or the reducers of the drive sources 401 to 406 are detected by the position sensors 411 to 416, respectively. The motors of the drive sources 401 to 406 are not particularly limited, but, for example, servo motors such as AC servo motors or DC servo motors are preferably and respectively used.

As shown in FIG. 5, the robot main body 10 is electrically connected to the robot controller 20. That is, the drive sources 401 to 406, the position sensors 411 to 416, and the angular velocity sensors 31, 32 are respectively electrically connected to the robot controller 20.

Further, the robot controller 20 may independently operate the arms 12 to 15 and the wrist 16, i.e., may independently control the drive sources 401 to 406 via the motor drivers 301 to 306. In this case, the robot controller 20 performs detection using the position sensors 411 to 416, the first angular velocity sensor 31, and the second angular velocity sensor 32 and respectively controls driving of the drive sources 401 to 406, for example, the angular velocities, rotation angles, or the like based on the detection results. The control program is stored in advance in a memory unit 22 of the robot controller 20 (see FIG. 6).

As shown in FIGS. 1 and 2, in the case where the robot 1 is a vertical articulated robot, the base 11 is apart located in the lowermost part of the vertical articulated robot and fixed to the floor 101 of the installation space. The fixing method is not particularly limited, but, for example, a fixing method using a plurality of bolts 111 is used in the embodiment shown in FIGS. 1 and 2. Note that the locations for fixing in the installation space of the base 11 may be provided not only on the floor but also on a wall or ceiling of the installation space.

The base 11 has a hollow base main body (housing) 112. The base main body 112 may be divided into a cylindrical part 113 having a cylindrical shape and a box part 114 having a box shape integrally formed in the outer periphery of the cylindrical part 113. Further, the base main body 112 houses the motor 401M and the motor drivers 301 to 306, for example.

Each of the arms 12 to 15 has a hollow arm main body (casing) 2, a drive mechanism 3, and a sealing member 4. Note that for convenience of explanation, the arm main body 2, the drive mechanism 3, and the sealing member 4 of the first arm 12 may be referred to as "arm main body 2*a*", "drive mechanism 3*a*", and "sealing member 4*a*", respectively, the arm main body 2, the drive mechanism 3, and the sealing member 4 of the second arm 13 may be referred to as "arm main body 2*b*", "drive mechanism 3*b*", and "sealing member 4*b*", respectively, the arm main body 2, the drive mechanism 3, and the sealing member 4 of the third arm 14 may be referred to as "arm main body 2*c*", "drive mechanism 3*c*", and "sealing member 4*c*", respectively, the arm main body 2, the drive mechanism 3, and the sealing member 4 of the fourth arm 15 may be referred to as "arm main body 2*d*", "drive mechanism 3*d*", and "sealing member 4*d*", respectively.

Further, each of the joints 171 to 176 has a rotation support mechanism (not shown). The rotation support mechanisms include mechanisms of supporting one of the two arms connected to each other rotatably with respect to the other, a mechanism of supporting one of the base 11 and the first arm 12 connected to each other rotatably with respect to the other, and a mechanism of supporting one of the fourth arm 15 and the wrist 16 connected to each other rotatably with respect to the other. In the case of the fourth arm 15 and the wrist 16 connected to each other as an example, the rotation support mechanism can rotate the wrist 16 with respect to the fourth arm 15. Further, each of the rotation support mechanisms has a reducer (not shown) that reduces the rotation speed of the corresponding motor at a predetermined reduction ratio and transmits the drive force to the corresponding arm, a wrist main body 161 of the wrist 16, and a support ring 162. Note that, as described above, in the embodiment, the drive source includes the reducer and the motor.

The first arm 12 is connected to the upper end (proximal end) of the base 11 in an attitude tilted with respect to the horizontal direction. In the first arm 12, the drive mechanism 3*a* has the motor 402M and is housed within the arm main body 2*a*. Further, the interior of the arm main body 2*a* is air-tightly sealed by the sealing member 4*a*.

The second arm 13 is connected to the proximal end of the first arm 12. In the second arm 13, the drive mechanism 3*b* has the motor 403M and is housed within the arm main body 2*b*. Further, the interior of the arm main body 2*b* is air-tightly sealed by the sealing member 4*b*.

The third arm 14 is connected to the proximal end of the second arm 13. In the third arm 14, the drive mechanism 3*c* has the motor 404M and is housed within the arm main body 2*c*. Further, the interior of the arm main body 2*c* is air-tightly sealed by the sealing member 4*c*.

The fourth arm 15 is connected to the proximal end of the third arm 14 parallel to the center axis direction thereof. In the arm 15, the drive mechanism 3*d* has the motors 405M, 406M and is housed within the arm main body 2*d*. Further, the interior of the arm main body 2*d* is air-tightly sealed by the sealing member 4*d*.

The wrist 16 is connected to the proximal end (the opposite end to the base 11) of the fourth arm 15. In the wrist 16, to the proximal end (the opposite end to the fourth arm 15) thereof, for example, a manipulator (not shown) that grasps precise equipment such as a wristwatch is detachably attached as a functional part (end effector). Note that the manipulator is not particularly limited, but includes, for example, a configuration having a plurality of fingers. Further, the robot 1 controls the operation of the arms 12 to 15, the wrist 16, while grasping the precise equipment with the manipulator, and thereby, may carry the precise equipment.

The wrist 16 has the wrist main body (sixth arm) 161 having a cylindrical shape and the support ring (fifth arm) 162 formed separately from the wrist main body 161, provided on the proximal end of the wrist main body 161, and having a ring shape.

A proximal end surface 163 of the wrist main body 161 is a flat surface and attachment surface to which the manipulator is attached. Further, the wrist main body 161 is connected to the drive mechanism 3*d* of the fourth arm 15 via the joint 176, and rotates around the rotation shaft $O_6$ by driving of the motor 406M of the drive mechanism 3*d*.

The support ring 162 is connected to the drive mechanism 3*d* of the fourth arm 15 via the joint 175, and rotates integrally with the wrist main body 161 around the rotation shaft $O_5$ by driving of the motor 405M of the drive mechanism 3*d*.

The constituent material of the arm main body 2 is not particularly limited, but, for example, various metal materials may be used. Among the materials, aluminum or an aluminum alloy is particularly preferable. In the case where the arm main body 2 is a cast molded using a die, die molding may be easily performed using aluminum or an aluminum alloy for the constituent material of the arm main body 2.

Further, the constituent material of the base main body 112 of the base 11, the wrist main body 161 of the wrist 16, and the support ring 162 is not particularly limited, but, for example, the same material as the constituent material of the arm main body 2 or the like may be respectively used. Note that stainless steel is preferably used for the constituent material of the wrist main body 161 of the wrist 16.

Furthermore, the constituent material of the sealing member 4 is not particularly limited, but, for example, various resin materials or various metal materials may be used. Note that a resin material is used as the constituent material of the sealing member 4, and thereby, reduction in weight may be realized.

Next, the configuration of the robot controller 20 will be explained with reference to FIGS. 5, 6, and 9 to 14.

As shown in FIGS. 5, 6, and 9 to 14, the robot controller 20 has a first drive source control unit 201 that controls the operation of the first drive source 401, a second drive source control unit 202 that controls the operation of the second drive source 402, a third drive source control unit 203 that controls the operation of the third drive source 403, a fourth drive source control unit 204 that controls the operation of the fourth drive source 404, a fifth drive source control unit 205 that controls the operation of the fifth drive source 405, a sixth drive source control unit 206 that controls the operation of the sixth drive source 406, an operation mode setting unit 21 that sets an operation mode of the robot main body 10 (robot 1), and the memory unit 22 that stores various kinds of information, programs, and the like. Note that, the memory unit 22 is not particularly limited, but, for example, various semiconductor memories or the like may be used.

The robot controller 20 is adapted to select and set one of three operation modes: "standard mode (first operation mode)"; "fast mode (second operation mode)"; and "low-vibration mode (third operation mode)" as the operation mode using the operation mode setting unit 21. The selection of the operation mode is performed by an operator using a predetermined input unit. Further, the selection of the operation mode may be determined based on predetermined information and automatically performed in the robot controller 20. Note that the respective drive source control units 201 to 206 will be explained first before the explanation of the respective operation modes.

Figure 9:
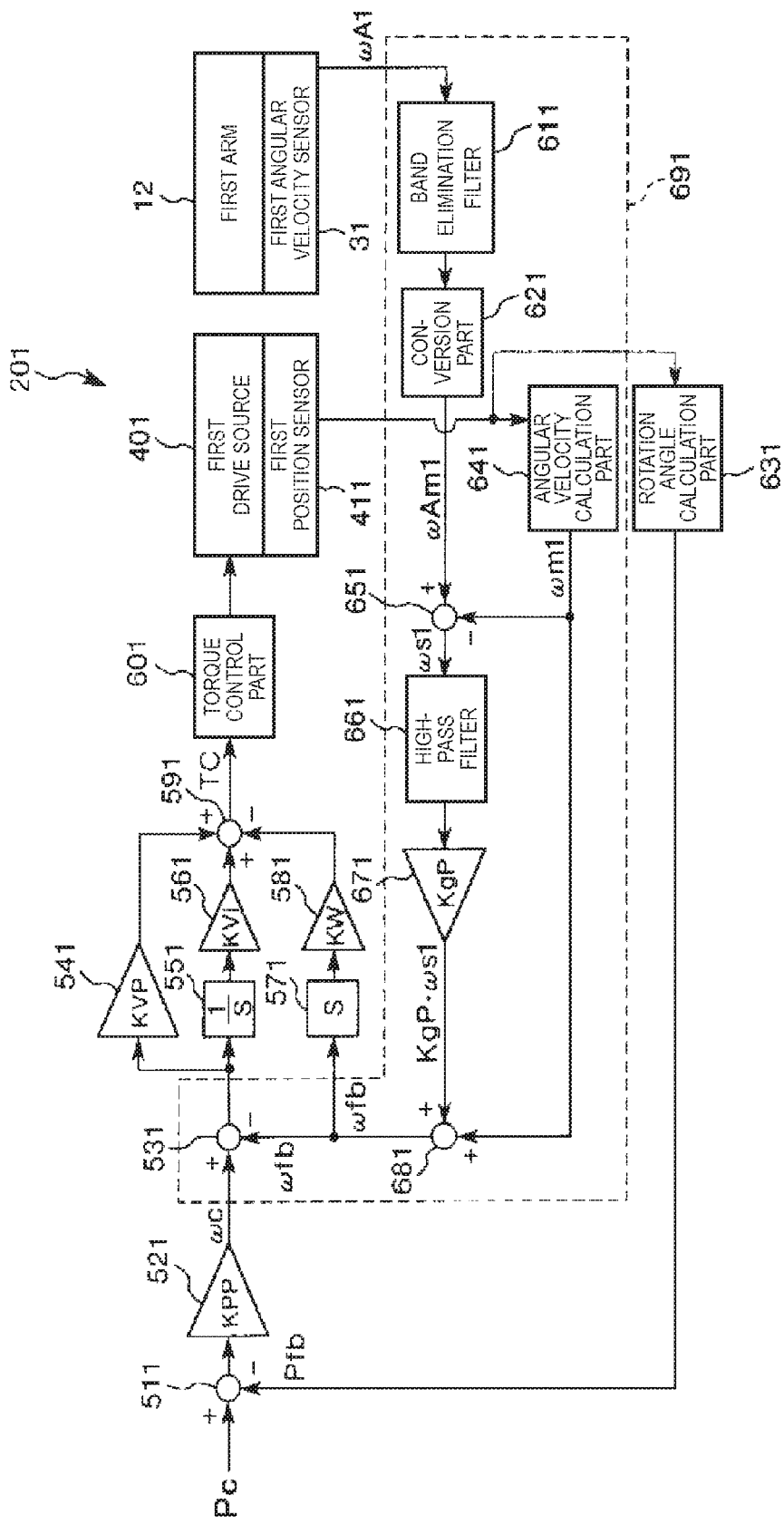
FIG. 9 is a block diagram of the part of the robot shown in FIG. 1.

As shown in FIG. 9, the first drive source control unit 201 has a servo circuit that controls the operation of the first drive source 401 based on the detection results of the first angular velocity sensor 31 and the first position sensor 411, i.e., a subtractor 511, a position control part 521, a subtracter 531, an amplifier 541, an integrator 551, an amplifier 561, a differentiator 571, an amplifier 581, an adder-subtractor 591, a torque control part 601, a band elimination filter 611, a conversion part 621, a rotation angle calculation part 631, an angular velocity calculation part 641, a subtractor 651, a high-pass filter 661, an amplifier (correction value calculation part) 671, and an adder 681.

The subtracter 531, the band elimination filter 611, the conversion part 621, the angular velocity calculation part 641, the subtractor 651, the high-pass filter 661, the amplifier 671, and the adder 681 form part of a gyro servo circuit 691 for vibration suppression control.

Figure 10:
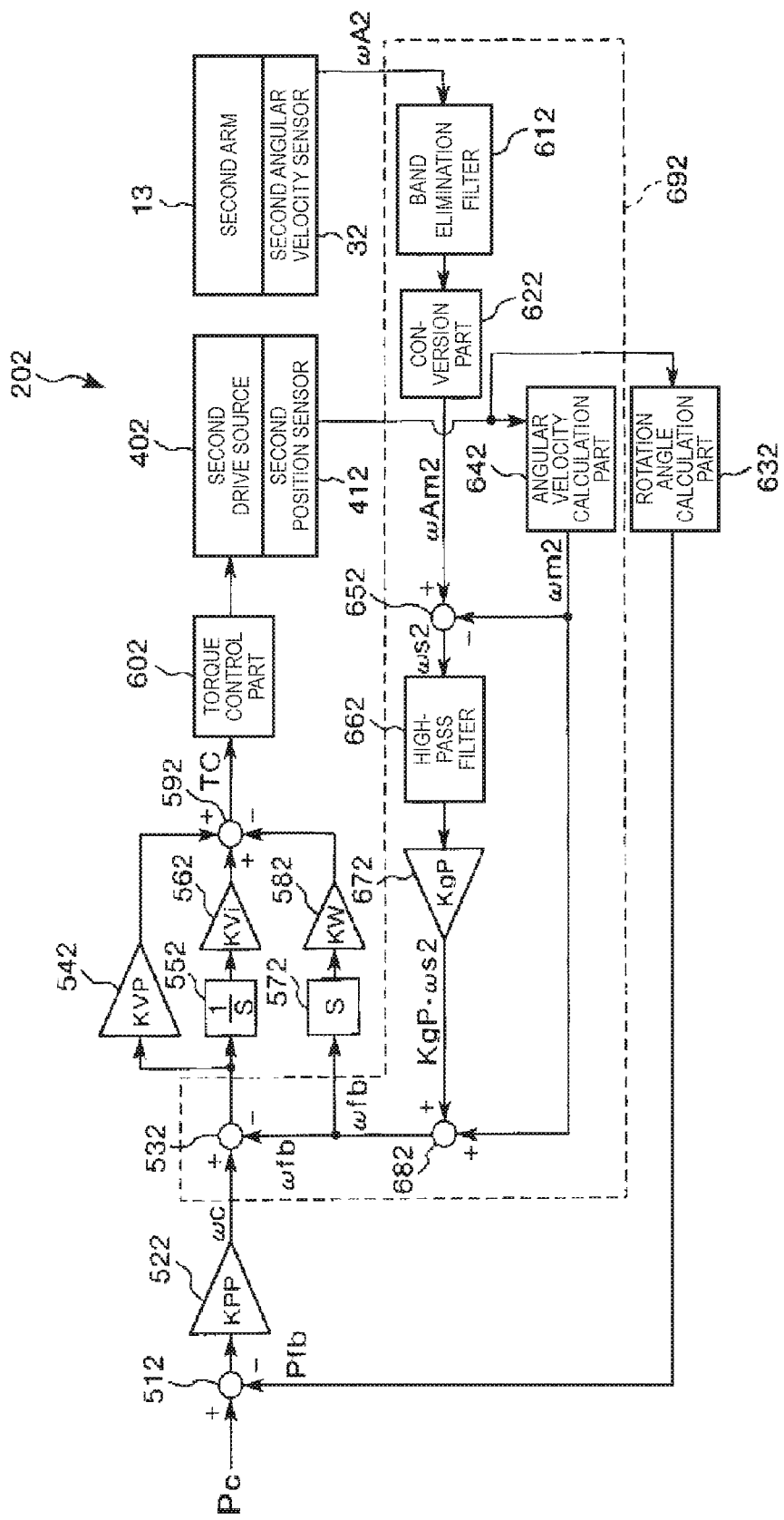
FIG. 10 is a block diagram of the part of the robot shown in FIG. 1.

As shown in FIG. 10, the second drive source control unit 202 has a servo circuit that controls the operation of the second drive source 402 based on the detection results of the second angular velocity sensor 32 and the second position sensor 412, i.e., a subtractor 512, a position control part 522, a subtracter 532, an amplifier 542, an integrator 552, an amplifier 562, a differentiator 572, an amplifier 582, an adder-subtractor 592, a torque control part 602, a band elimination filter 612, a conversion part 622, a rotation angle calculation part 632, an angular velocity calculation part 642, a subtractor 652, a high-pass filter 662, an amplifier (correction value calculation part) 672, and an adder 682.

The subtracter 532, the band elimination filter 612, the conversion part 622, the angular velocity calculation part 642, the subtractor 652, the high-pass filter 662, the amplifier 672, and the adder 682 form part of a gyro servo circuit 692 for vibration suppression control.

Figure 11:
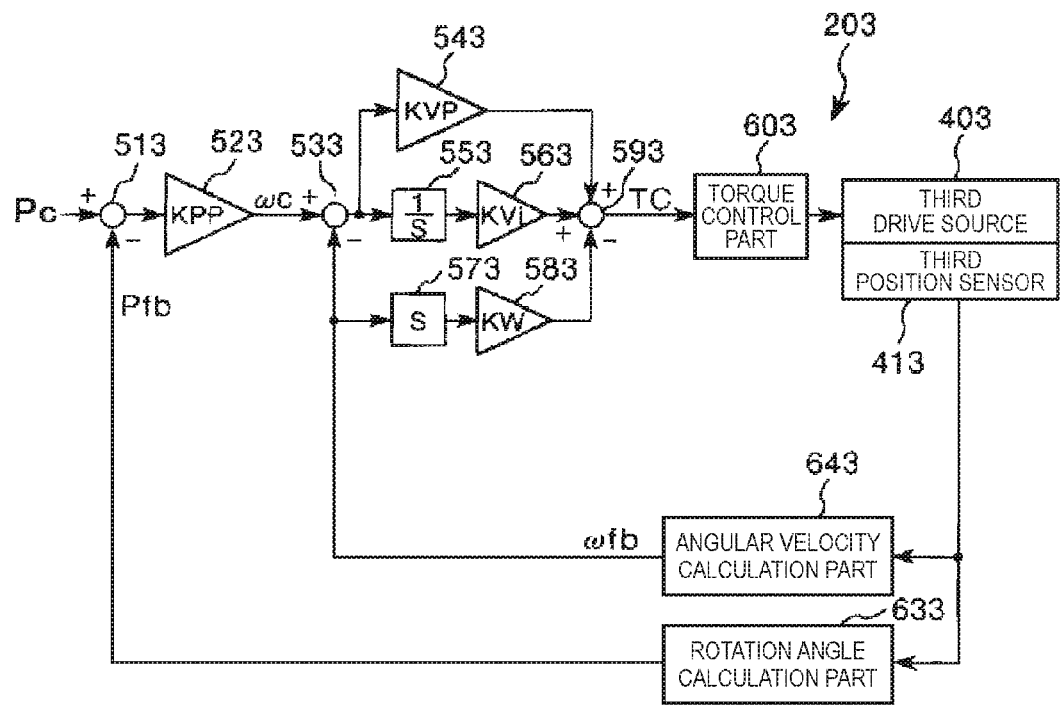
FIG. 11 is a block diagram of the part of the robot shown in FIG. 1.

As shown in FIG. 11, the third drive source control unit 203 has a servo circuit that controls the operation of the third drive source 403 based on the detection result of the third position sensor 413, i.e., a subtractor 513, a position control part 523, a subtracter 533, an amplifier 543, an integrator 553, an amplifier 563, a differentiator 573, an amplifier 583, an adder-subtractor 593, a torque control part 603, a rotation angle calculation part 633, and an angular velocity calculation part 643.

Figure 12:
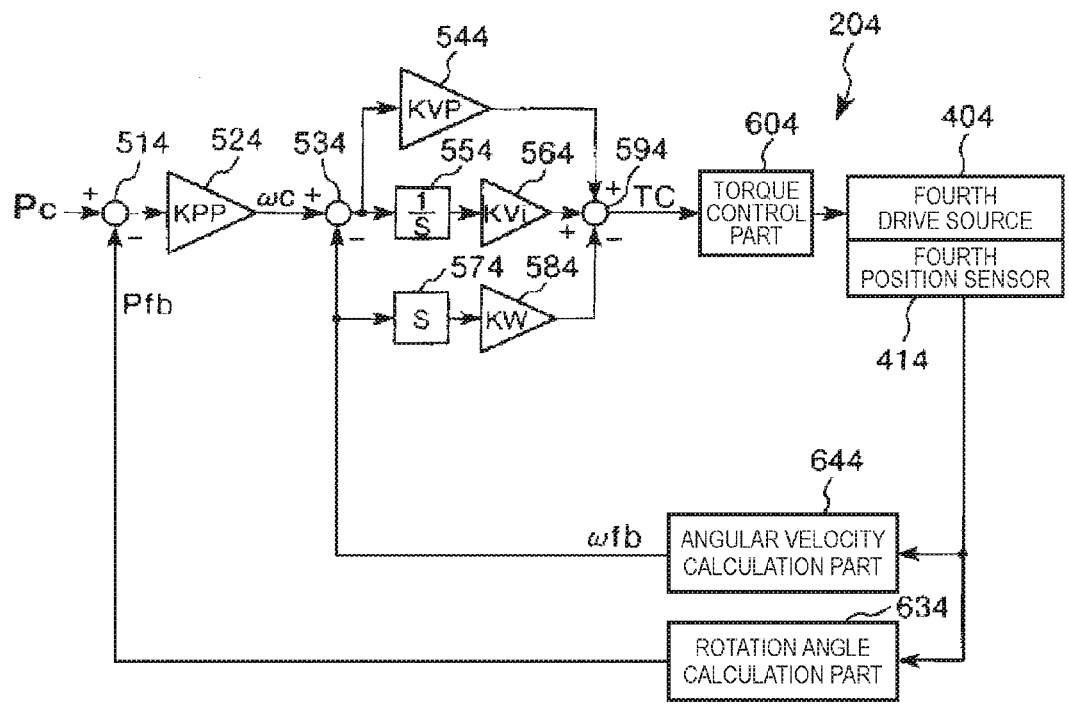
FIG. 12 is a block diagram of the part of the robot shown in FIG. 1.

As shown in FIG. 12, the fourth drive source control unit 204 has a servo circuit that controls the operation of the fourth drive source 404 based on the detection result of the fourth position sensor 414, i.e., a subtractor 514, a position control part 524, a subtracter 534, an amplifier 544, an integrator 554, an amplifier 564, a differentiator 574, an amplifier 584, an adder-subtractor 594, a torque control part 604, a rotation angle calculation part 634, and an angular velocity calculation part 644.

Figure 13:
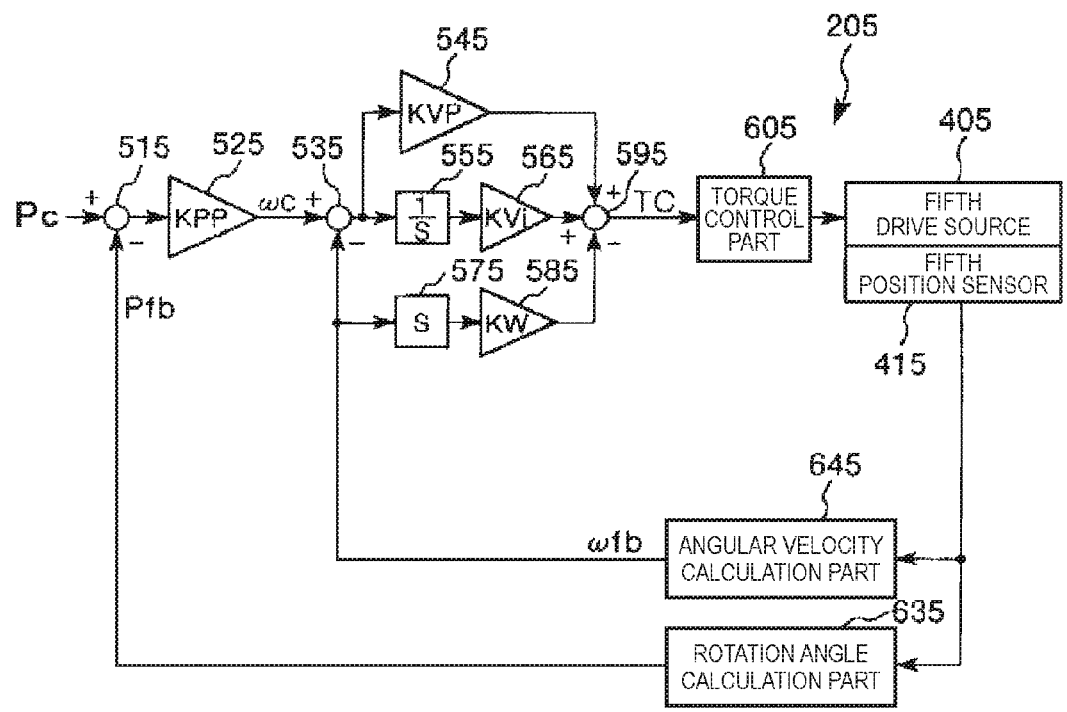
FIG. 13 is a block diagram of the part of the robot shown in FIG. 1.

As shown in FIG. 13, the fifth drive source control unit 205 has a servo circuit that controls the operation of the fifth drive source 405 based on the detection result of the fifth position sensor 415, i.e., a subtractor 515, a position control part 525, a subtracter 535, an amplifier 545, an integrator 555, an amplifier 565, a differentiator 575, an amplifier 585, an adder-subtractor 595, a torque control part 605, a rotation angle calculation part 635, and an angular velocity calculation part 645.

Figure 14:
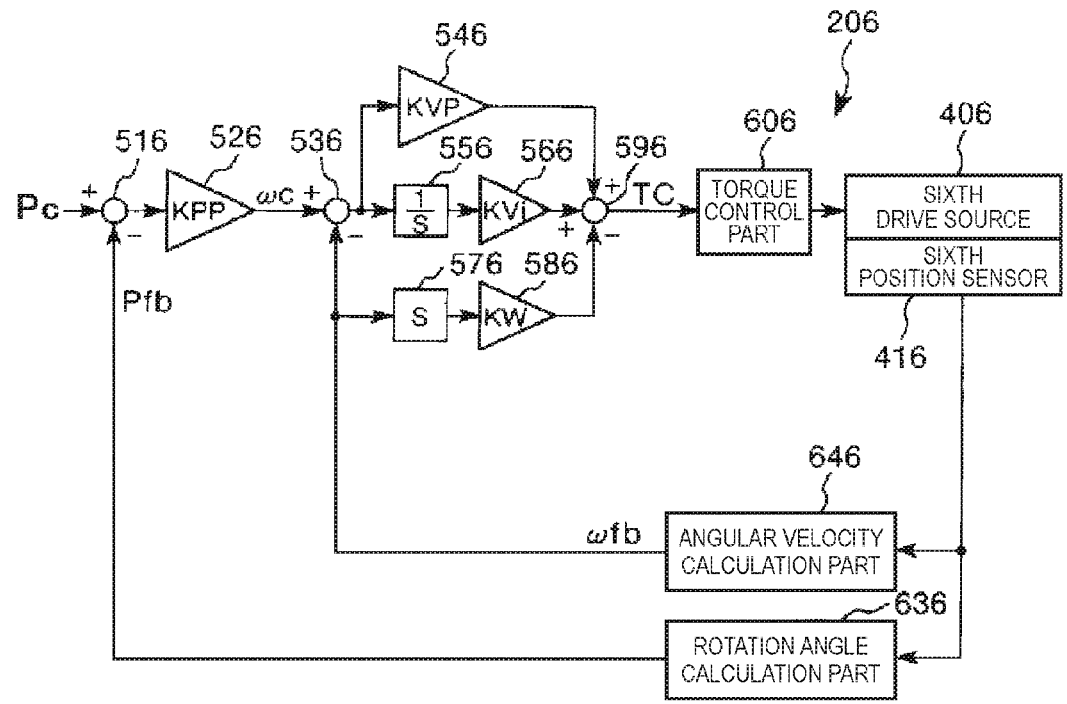
FIG. 14 is a block diagram of the part of the robot shown in FIG. 1.

As shown in FIG. 14, the sixth drive source control unit 206 has a servo circuit that controls the operation of the sixth drive source 406 based on the detection result of the sixth position sensor 416, i.e., a subtractor 516, a position control part 526, a subtracter 536, an amplifier 546, an integrator 556, an amplifier 566, a differentiator 576, an amplifier 586, an adder-subtractor 596, a torque control part 606, a rotation angle calculation part 636, and an angular velocity calculation part 646.

Here, the robot controller 20 calculates the target position of the wrist 16 based on the processing performed by the robot 1 and generates a trajectory for moving the wrist 16 to the target position. Then, the robot controller 20 measures the rotation angles of the respective drive sources 401 to 406 with respect to each predetermined control cycle and outputs values calculated based on the measurement results as position commands Pc of the respective drive sources 401 to 406 to the drive source control units 201 to 206 so that the wrist 16 may move along the generated trajectory (see FIGS. 9 to 14). Note that the phrase "values are input or output" is used in the specification, and the phrase means that "signals corresponding to the values are input or output".

As shown in FIG. 9, not only the position command (angle command) Pc of the first drive source 401 is supplied to the first drive source control unit 201, but also detection signals are respectively input from the first position sensor 411 and the first angular velocity sensor 31. The first drive source control unit 201 drives the first drive source 401 by feedback control using the respective detection signals so that the rotation angle (position feedback value Pfb) of the first drive source 401 calculated from the detection signal of the first position sensor 411 may be the position command Pc and an angular velocity feedback value ωfb to be described later may be an angular velocity command ωc to be described later.

The position command Pc and the position feedback value Pfb to be descried later are input from the rotation angle calculation part 631 to the subtractor 511 of the first drive source control unit 201. In the rotation angle calculation part 631, the pulse number input from the first position sensor 411 is counted and the rotation angle of the first drive source 401 in response to the count value is output as the position feedback value Pfb to the subtractor 511. The subtractor 511 outputs deviation of the position command Pc from the position feedback value Pfb (the value obtained by subtraction of the position feedback value Pfb from the target value of the rotation angle of the first drive source 401) to the position control part 521.

The position control part 521 performs predetermined calculation processing using the deviation input from the subtractor 511, gain (servo gain) Kpp as a predetermined factor, and thereby, calculates the target value of the angular velocity of the first drive source 401 in response to the deviation. The position control part 521 outputs a signal representing the target value (command value) of the angular velocity of the first drive source 401 as the angular velocity command ωc to the subtractor 531. Note that, here, as the feedback control, for example, proportional control (P-control) is performed, but not limited thereto.

The angular velocity command ωc and the angular velocity feedback value ωfb to be described later are input to the subtracter 531. The subtracter 531 respectively outputs deviation of the angular velocity command ωc from the angular velocity feedback value ωfb (the value obtained by subtraction of the angular velocity feedback value ωfb from the target value of the rotation angle of the first drive source 401) to the amplifier 541 and the integrator 551.

The amplifier 541 performs predetermined calculation processing using the deviation input from the subtractor 531, gain (proportional gain) (servo gain) Kvp as a predetermined factor, and outputs the result to the adder-subtractor 591.

Further, the integrator 551 integrates the deviation input from the subtractor 531, and then, the amplifier 561 performs predetermined calculation processing using gain (integral gain) (servo gain) Kvi as a predetermined factor and outputs the result to the adder-subtractor 591.

Furthermore, the angular velocity feedback value ωfb to be described later is input to the differentiator 571. The differentiator 571 differentiates the angular velocity feedback value ωfb, and then, the amplifier 581 performs predetermined calculation processing using gain (differential gain) (servo gain) Kw as a predetermined factor and outputs the result to the adder-subtractor 591.

The adder-subtractor 591 adds the input value from the amplifier 541, adds the input value from the amplifier 561, and subtracts the input value from the amplifier 581, and thereby, calculates the target value of the torque of the first drive source 401 in response to the deviation input from the subtracter 531. The adder-subtractor 591 outputs a signal representing the target value (command value) of the torque of the first drive source 401 as a torque command Tc to the torque control part 601. Note that, here, in the embodiment, as the feedback control, PID control is performed, but not limited thereto.

The torque control part 601 generates and outputs a drive signal (drive current) in response to the torque command Tc to the motor 401M of the first drive source 401 via the motor driver 301.

In this manner, the feedback control is performed so that the position feedback value Pfb may be equal to the position command Pc as soon as possible and the angular velocity feedback value ωfb may be equal to the angular velocity command ωc as soon as possible, and the drive current of the first drive source 401 is controlled.

Next, the angular velocity feedback value ωfb in the first drive source control unit 201 will be explained.

In the angular velocity calculation part 641, an angular velocity ωm1 of the first drive source 401 is calculated based on the frequency of the pulse signal input from the first position sensor 411, and the angular velocity ωm1 is respectively output to the adder 681 and the subtractor 651.

Further, the angular velocity around the first rotation shaft $O_1$ of the first arm 12 is detected by the first angular velocity sensor 31. Then, in the band elimination filter 611, a frequency component of a specific frequency range is removed from the detection signal of the first angular velocity sensor 31, i.e., an angular velocity ωA1 around the first rotation shaft $O_1$ of the first arm 12 detected by the first angular velocity sensor 31. Then, the angular velocity ωA1 is converted into an angular velocity ωAm1 of the first drive source 401 corresponding to the angular velocity ωA1 using the reduction ratio between the motor 401M of the first drive source 401 and the first arm 12, i.e., in the joint 171 or the like in the conversion part 621 and output to the subtractor 651.

The angular velocity ωAm1 and the angular velocity ωm1 are input to the subtractor 651 and the subtractor 651 outputs a value ωs1 obtained by subtraction of the angular velocity ωm1 from the angular velocity ωAm1 (=ωAm1−ωm1) to the high-pass filter 661. The value ωs1 corresponds to the vibration component of the angular velocity around the first rotation shaft $O_1$ of the first arm 12 (vibration angular velocity). In the following, ωs1 is referred to as "vibration angular velocity". In the embodiment, feedback control of multiplying the vibration angular velocity ωs1 by gain Kgp to be described later and returning it to the input side of the first drive source 401 is performed. Specifically, the feedback control is performed on the first drive source 401 so that the vibration angular velocity ωs1 may be zero as soon as possible. Thereby, the vibration of the robot 1 may be suppressed. Note that, in the feedback control, the angular velocity of the first drive source 401 is controlled.

The high-pass filter 661 removes the frequency components equal to or lower than a predetermined frequency from the vibration angular velocity ωs1 and outputs it to the amplifier 671.

The amplifier 671 multiplies the vibration angular velocity ωs1 by gain (servo gain) Kgp as a predetermined factor, obtains a correction value Kgp·ωs1, and outputs the correction value Kgp·ωs1 to the adder 681.

The angular velocity ωm1 and the correction value Kgp·ωs1 are input to the adder 681. The adder 681 respectively outputs an addition value of the angular velocity ωm1 and the correction value Kgp·ωs1 as the angular velocity feedback value ωfb to the subtracter 531 and the differentiator 571. Note that the subsequent operation is performed in the above described manner.

Further, the first drive source control unit 201 has a function of turning the gain Kgp to zero before the first arm 12 is stopped when the operation of the first arm 12 is stopped. The time when the gain Kgp is turned to zero is not particularly limited, but appropriately set according to various conditions.

As shown in FIG. 10, to the second drive source control unit 202, not only the position command Pc of the second drive source 402 but also detection signals are respectively input from the second position sensor 412 and the second angular velocity sensor 32. The second drive source control unit 202 drives the second drive source 402 by feedback control using the respective detection signals so that the rotation angle (position feedback value Pfb) of the second drive source 402 calculated from the detection signal of the second position sensor 412 may be the position command Pc and the angular velocity feedback value ωfb to be described later may be the angular velocity command ωc to be described later.

That is, to the subtractor 512 of the second drive source control unit 202, the position command Pc is input and the position feedback value Pfb to be descried later is input from the rotation angle calculation part 632. In the rotation angle calculation part 632, the pulse number input from the second position sensor 412 is counted and the rotation angle of the second drive source 402 in response to the count value is output as the position feedback value Pfb to the subtractor 512. The subtractor 512 outputs deviation of the position command Pc from the position feedback value Pfb (the value obtained by subtraction of the position feedback value Pfb from the target value of the rotation angle of the second drive source 402) to the position control part 522.

The position control part 522 performs predetermined calculation processing using the deviation input from the subtractor 512, gain (servo gain) Kpp as a predetermined factor, and thereby, calculates the target value of the angular velocity of the second drive source 402 in response to the deviation. The position control part 522 outputs a signal representing the target value (command value) of the angular velocity of the second drive source 402 as the angular velocity command ωc to the subtractor 532. Note that, here, as the feedback control, for example, proportional control (P-control) is performed, but not limited thereto. Further, the gain Kpp in the second drive source control unit 202 and the gain Kpp in the first drive source control unit 201 may be the same or different.

The angular velocity command ωc and the angular velocity feedback value ωfb to be described later are input to the subtracter 532. The subtracter 532 respectively outputs deviation of the angular velocity command ωc from the angular velocity feedback value ωfb (the value obtained by subtraction of the angular velocity feedback value ωfb from the target value of the rotation angle of the second drive source 402) to the amplifier 542 and the integrator 552.

The amplifier 542 performs predetermined calculation processing using the deviation input from the subtractor 532, gain (proportional gain) (servo gain) Kvp as a predetermined factor, and outputs the result to the adder-subtractor 591. Note that the gain Kvp in the second drive source control unit 202 and the gain Kvp in the first drive source control unit 201 may be the same or different.

Further, the integrator 552 integrates the deviation input from the subtractor 532, and then, the amplifier 562 performs predetermined calculation processing using gain (integral gain) (servo gain) Kvi as a predetermined factor and outputs the result to the adder-subtractor 592. Note that the gain Kvi in the second drive source control unit 202 and the gain Kvi in the first drive source control unit 201 may be the same or different.

Furthermore, the angular velocity feedback value ωfb to be described later is input to the differentiator 572. The differentiator 572 differentiates the angular velocity feedback value ωfb, and then, the amplifier 582 performs predetermined calculation processing using gain (differential gain) (servo gain) Kw as a predetermined factor and outputs the result to the adder-subtractor 592. Note that the gain Kw in the second drive source control unit 202 and the gain Kw in the first drive source control unit 201 may be the same or different.

The adder-subtractor 592 adds the input value from the amplifier 542, adds the input value from the amplifier 562, and subtracts the input value from the amplifier 582, and thereby, calculates the target value of the torque of the second drive source 402 in response to the deviation input from the subtracter 532. The adder-subtractor 592 outputs a signal representing the target value (command value) of the torque of the second drive source 402 as a torque command Tc to the torque control part 602. Note that, here, in the embodiment, as the feedback control, PID control is performed, but not limited thereto.

The torque control part 602 generates and outputs a drive signal (drive current) in response to the torque command Tc to the motor 402M of the second drive source 402 via the motor driver 302.

In this manner, the feedback control is performed so that the position feedback value Pfb may be equal to the position command Pc as soon as possible and the angular velocity feedback value ωfb may be equal to the angular velocity command ωc as soon as possible, and the drive current of the second drive source 402 is controlled. Note that the second rotation shaft $O_2$ is orthogonal to the first rotation shaft $O_1$ and not affected by the operation and the vibration of the first arm 12, and thus, the operation of the second drive source 402 may be controlled independently from the first drive source 401.

Next, the angular velocity feedback value ωfb in the second drive source control unit 202 will be explained.

In the angular velocity calculation part 642, an angular velocity ωm2 of the second drive source 402 is calculated based on the frequency of the pulse signal input from the second position sensor 412, and the angular velocity ωm2 is respectively output to the adder 682 and the subtractor 652.

Further, the angular velocity around the second rotation shaft $O_2$ of the second arm 13 is detected by the second angular velocity sensor 32. Then, in the band elimination filter 612, a frequency component of a specific frequency range is removed from the detection signal of the second angular velocity sensor 32, i.e., an angular velocity ωA2 around the second rotation shaft $O_2$ of the second arm 13 detected by the second angular velocity sensor 32. Then, the angular velocity ωA2 is converted into an angular velocity ωAm2 of the second drive source 402 corresponding to the angular velocity ωA2 using the reduction ratio between the motor 402M of the second drive source 402 and the second arm 13, i.e., in the joint 172 or the like by the conversion part 622 and output to the subtractor 652. Note that the second rotation shaft $O_2$ is orthogonal to the first rotation shaft $O_1$ and not affected by the operation and the vibration of the first arm 12, and thus, the angular velocity around the second rotation shaft $O_2$ of the second arm 13 may be obtained easily and reliably.

The angular velocity ωAm2 and the angular velocity ωm2 are input to the subtractor 652 and the subtractor 652 outputs a value ωs2 obtained by subtraction of the angular velocity ωm2 from the angular velocity ωAm2 (=ωAm2−ωm2) to the high-pass filter 662. The value ωs2 corresponds to the vibration component of the angular velocity around the second rotation shaft $O_2$ of the second arm 13 (vibration angular velocity). In the following, ωs2 is referred to as "vibration angular velocity". In the embodiment, feedback control of multiplying the vibration angular velocity ωs2 by gain Kgp to be described later and returning it to the input side of the second drive source 402 is performed. Specifically, the feedback control is performed on the second drive source 402 so that the vibration angular velocity ωs2 may be zero as soon as possible. Thereby, the vibration of the robot 1 may be suppressed. Note that, in the feedback control, the angular velocity of the second drive source 402 is controlled.

The high-pass filter 662 removes the frequency components equal to or lower than a predetermined frequency from the vibration angular velocity ωs2 and outputs it to the amplifier 672.

The amplifier 672 multiplies the vibration angular velocity ωs2 by gain (servo gain) Kgp as a predetermined factor, obtains a correction value Kgp·ωs2, and outputs the correction value Kgp·ωs2 to the adder 682. Note that the gain Kgp in the second drive source control unit 202 and the gain Kgp in the first drive source control unit 201 may be the same or different.

The angular velocity ωm2 and the correction value Kgp·ωs2 are input to the adder 682. The adder 682 respectively outputs an addition value of the angular velocity ωm2 and the correction value Kgp·ωs2 as the angular velocity feedback value ωfb to the subtracter 532 and the differentiator 572. Note that the subsequent operation is performed in the above described manner.

Further, the second drive source control unit 202 has a function of turning the gain Kgp to zero before the second arm 13 is stopped when the operation of the second arm 13 is stopped. The time when the gain Kgp is turned to zero is not particularly limited, but appropriately set according to various conditions.

As shown in FIG. 11, to the third drive source control unit 203, not only the position command Pc of the third drive source 403 but also a detection signal is input from the third position sensor 413. The third drive source control unit 203 drives the third drive source 403 by feedback control using the respective detection signals so that the rotation angle (position feedback value Pfb) of the third drive source 403 calculated from the detection signal of the third position sensor 413 may be the position command Pc and the angular velocity feedback value ωfb to be described later may be the angular velocity command ωc to be described later.

That is, to the subtractor 513 of the third drive source control unit 203, the position command Pc is input and the position feedback value Pfb to be descried later is input from the rotation angle calculation part 633. In the rotation angle calculation part 633, the pulse number input from the third position sensor 413 is counted and the rotation angle of the third drive source 403 in response to the count value is output as the position feedback value Pfb to the subtractor 513. The subtractor 513 outputs deviation of the position command Pc from the position feedback value Pfb (the value obtained by subtraction of the position feedback value Pfb from the target value of the rotation angle of the third drive source 403) to the position control part 523.

The position control part 523 performs predetermined calculation processing using the deviation input from the subtractor 513, gain (servo gain) Kpp as a predetermined factor, and thereby, calculates the target value of the angular velocity of the third drive source 403 in response to the deviation. The position control part 523 outputs a signal representing the target value (command value) of the angular velocity of the third drive source 403 as the angular velocity command ωc to the subtractor 533. Note that, here, as the feedback control, for example, proportional control (P-control) is performed, but not limited thereto. Further, the gain Kpp in the third drive source control unit 203 may be the same as or different from the gain Kpp in the first drive source control unit 201 and the gain Kpp in the second drive source control unit 202.

The angular velocity command ωc and the angular velocity feedback value ωfb to be described later are input to the subtracter 533. The subtracter 533 respectively outputs deviation of the angular velocity command ωc from the angular velocity feedback value ωfb (the value obtained by subtraction of the angular velocity feedback value ωfb from the target value of the angular velocity of the third drive source 403) to the amplifier 543 and the integrator 553.

The amplifier 543 performs predetermined calculation processing using the deviation input from the subtractor 533, gain (proportional gain) (servo gain) Kvp as a predetermined factor, and outputs the result to the adder-subtractor 591. Note that the gain Kvp in the third drive source control unit 203 may be the same as or different from the gain Kvp in the first drive source control unit 201 and the gain Kvp in the second drive source control unit 202.

Further, the integrator 553 integrates the deviation input from the subtractor 533, and then, the amplifier 563 performs predetermined calculation processing using gain (integral gain) (servo gain) Kvi as a predetermined factor and outputs the result to the adder-subtractor 593. Note that the gain Kvi in the third drive source control unit 203 may be the same as or different from the gain Kvi in the first drive source control unit 201 and the gain Kvi in the second drive source control unit 202.

Furthermore, the angular velocity feedback value ωfb to be described later is input to the differentiator 573. The differentiator 573 differentiates the angular velocity feedback value ωfb, and then, the amplifier 583 performs predetermined calculation processing using gain (differential gain) (servo gain) Kw as a predetermined factor and outputs the result to the adder-subtractor 593. Note that the gain Kw in the third drive source control unit 203 may be the same as or different from the gain Kw in the first drive source control unit 201 and the gain Kw in the second drive source control unit 202.

The adder-subtractor 593 adds the input value from the amplifier 543, adds the input value from the amplifier 563, and subtracts the input value from the amplifier 583, and thereby, calculates the target value of the torque of the third drive source 403 in response to the deviation input from the subtracter 533. The adder-subtractor 593 outputs a signal representing the target value (command value) of the torque of the third drive source 403 as a torque command Tc to the torque control part 603. Note that, here, in the embodiment, as the feedback control, PID control is performed, but not limited thereto.

The torque control part 603 generates and outputs a drive signal (drive current) in response to the torque command Tc to the motor 403M of the third drive source 403 via the motor driver 303.

In this manner, the feedback control is performed so that the position feedback value Pfb may be equal to the position command Pc as soon as possible and the angular velocity feedback value ωfb may be equal to the angular velocity command ωc as soon as possible, and the drive current of the third drive source 403 is controlled.

Note that the drive source control units 204 to 206 are respectively the same as the third drive source control unit 203, and their explanation will be omitted.

As described above, the operation mode setting unit 21 of the robot controller 20 selects and sets one of "standard mode (first operation mode)", "fast mode (second operation mode)", and "low-vibration mode (third operation mode)" as the operation mode of the robot main body 10 (robot 1). Note that respective parameters set in the respective operation modes are respectively stored in advance in the memory unit 22, and the operation mode setting unit 21 reads necessary parameters from the memory unit 22 and sets the operation mode when necessary.

The fast mode is the high-speed-specialized type operation mode in which the time to reach the target position is shorter. Further, the low-vibration mode is the vibration-suppression-specialized type operation mode at deactivation in which the vibration when the operation is stopped is smaller. Furthermore, the standard mode is the compatible type operation mode that ensures compatibility between high-speed performance and vibration-suppression at the deactivation. Note that, in the fast mode, the arms 12 to 15 and the wrist 16 operate faster than those in the standard mode. Further, in the low-vibration mode, the arms 12 to 15 and the wrist 16 vibrate less than those in the standard mode.

In the following, the explanation will be made with reference to the values of the respective parameters in the standard mode. Further, the operation modes of the respective arms 12 to 15 and the wrist 16 are the same, and the operation modes of the first arm 12 will be representatively explained below.

First, in the standard mode, the maximum acceleration of the first arm 12, the minimum deceleration of the first arm 12, the maximum speed of the first arm 12, and an automatic acceleration correction factor as a correction factor respectively multiplied by the maximum acceleration and the minimum deceleration of the first arm 12 in response to the attitude of the first arm 12, and the respective gain Kpp, Kvp, Kvi, Kw, Kgp of the first drive source control unit 201 are respectively set to standard values.

Note that the correction factor respectively multiplied by the maximum acceleration and the minimum deceleration of the first arm 12 in response to the attitude of the first arm 12 is, in a strict sense, a product of the automatic acceleration correction factor as a constant and a variable factor that changes in response to the attitude of the first arm 12. The variable factor is a larger value as the first arm 12 is curved larger, i.e., the inertia moment is larger. Further, the correction factor is proportional to the automatic acceleration correction factor.

Next, the fast mode will be explained with reference to the standard mode.

In the fast mode, the maximum acceleration of the first arm 12 is set to be 1 to 2 times that in the standard mode. Thereby, the time to reach the target position may be made shorter.

In this case, it is preferable that the maximum acceleration is more than that in the standard mode. Specifically, the maximum acceleration of the first arm 12 is preferably 1.1 to 2 times and more preferably 1.1 to 1.5 times that in the standard mode. Thereby, the time to reach the target position may be made even shorter.

The maximum acceleration of the first arm 12 may be changed by changing the magnitude of the drive current of the first drive source.

Further, in the fast mode, the maximum deceleration (the absolute value of the maximum deceleration) of the first arm 12 is set to be 1 to 2 times that in the standard mode. Thereby, the time to reach the target position may be made shorter.

In this case, it is preferable that the maximum deceleration (the absolute value of the maximum deceleration) of the first arm 12 is more than that in the standard mode. Specifically, the maximum deceleration of the first arm 12 is preferably 1.1 to 2 times and more preferably 1.1 to 1.5 times that in the standard mode. Thereby, the time to reach the target position may be made even shorter.

The maximum deceleration of the first arm 12 may be changed by changing the magnitude of the drive current of the first drive source.

Further, in the fast mode, the maximum speed of the first arm 12 may be set to a value different from that in the standard mode, however, preferably set to be equal to that in the standard mode. Thereby, stable operation may be performed.

Furthermore, in the fast mode, the automatic acceleration correction factor of the first arm 12 is set to be 0.5 to 2.5 times that in the standard mode. Thereby, the time to reach the target position may be made shorter.

In this case, it is preferable that the automatic acceleration correction factor is more than that in the standard mode. Specifically, the automatic acceleration correction factor of the first arm 12 is preferably 1.1 to 2 times and more preferably 1.1 to 1.8 times that in the standard mode. Thereby, the time to reach the target position may be made even shorter.

Further, in the fast mode, all of the respective gains Kpp, Kvp, Kvi, Kw, Kgp of the first drive source control unit 201 are set to be equal to those in the standard mode. Thereby, even in the operation of the robot 1, the mode may be changed from the fast mode to the standard mode and from the standard mode to the fast mode. Thereby, the work efficiency may be improved.

Furthermore, in the fast mode, the cycle time as a time taken when the robot 1 (first arm 12) performs predetermined test operation is 90% or less than that in the standard mode. Thereby, the time to reach the target position may be made shorter.

Note that the shorter the cycle time, the more preferable. However, in consideration of deterioration of other characteristics, the cycle time is preferably 1% to 90% and more preferably 5% to 80% of that in the standard mode.

Next, the test operation at measurement of the cycle time will be explained.

As shown in FIG. 7, the test operation at measurement of the cycle time is to reciprocate the distal end of the wrist 16 at the maximum speeds, the maximum acceleration, and the maximum deceleration of the respective arms 12 to 15 and the wrist 16 under the condition that a weight of 2 kg is held at the distal end of the wrist 16 (the distal end of the arm connected body) of the robot 1.

In each of the first half and the second half in the reciprocation, a rising operation of moving the distal end of the wrist 160 by 25 mm upwardly in the vertical direction, a horizontal moving operation of moving the end by 300 mm in the horizontal direction, and a falling operation of moving the end by 25 mm downwardly in the vertical direction are performed, and the rising operation and the initial part of the horizontal moving operation are performed at the same time and the falling operation and the terminal part of the horizontal moving operation are performed at the same time.

Next, the low-vibration mode will be explained with reference to the standard mode.

In the low-vibration mode, the maximum acceleration of the first arm 12 is set to be 0.5 to 1.5 times that in the standard mode. Thereby, the vibration when the operation is stopped may be made smaller.

In this case, it is preferable that the maximum acceleration is less than that in the standard mode. Specifically, the maximum acceleration of the first arm 12 is preferably 0.5 to 0.9 times and more preferably 0.6 to 0.8 times that in the standard mode. Thereby, the vibration when the operation is stopped may be made even smaller.

Further, in the low-vibration mode, the maximum deceleration (the absolute value of the maximum deceleration) of the first arm 12 is set to be 0.5 to 1.5 times that in the standard mode. Thereby, the vibration when the operation is stopped may be made smaller.

In this case, it is preferable that the maximum deceleration (the absolute value of the maximum deceleration) of the first arm 12 is less than that in the standard mode. Specifically, the maximum deceleration of the first arm 12 is preferably 0.5 to 0.9 times and more preferably 0.6 to 0.8 times that in the standard mode. Thereby, the vibration when the operation is stopped may be made even smaller.

Further, in the low-vibration mode, the maximum speed of the first arm 12 may be set to a value different from that in the standard mode, however, preferably set to be equal to that in the standard mode. Thereby, stable operation may be performed.

Furthermore, in the low-vibration mode, the automatic acceleration correction factor of the first arm 12 is set to be 0.5 to 1.5 times that in the standard mode. Thereby, the vibration when the operation is stopped may be made smaller.

In this case, it is preferable that the automatic acceleration correction factor is more than or equal to that in the standard mode. Specifically, the automatic acceleration correction factor of the first arm 12 is preferably 1 to 1.5 times and more preferably 1 to 1.3 times that in the standard mode. Thereby, the vibration when the operation is stopped may be made even smaller.

Further, in the low-vibration mode, the respective gains Kpp, Kvp, Kvi, Kw, Kgp of the first drive source control unit 201 are set to be 0.5 to 1.5 times those in the standard mode. Thereby, the vibration when the operation is stopped may be made smaller.

In this case, it is preferable that the respective gains Kpp, Kvp, Kvi, Kw, Kgp are smaller than or equal to those in the standard mode. Specifically, it is preferable that the respective gains Kpp, Kvp, Kvi, Kw, Kgp are 0.5 to 1 time those in the standard mode. Thereby, the vibration when the operation is stopped may be made even smaller.

Furthermore, in the low-vibration mode, when the operation of the first arm 12 is stopped, if the servo gain Kgp is set to zero, the time to set the servo gain Kgp to zero may be the same as or different from that in the standard mode, and it is preferable that the time is earlier than that in the standard mode. In this case, it is preferable that the time to set the servo gain Kgp to zero is earlier than that in the standard mode by the time of 0.1 to 1 second. Thereby, the vibration when the operation is stopped may be made even smaller.

In addition, in the low-vibration mode, when the first arm 12 performs predetermined test operation and is displaced to the target position, an excessive amount of passage from position as an amount of shift when the arm first passes the target position and shifts from the target position is 0.5 times or less than that in the standard mode or 30 μm or less. Thereby, the vibration when the operation is stopped may be made smaller.

Note that the smaller the excessive amount of passage from position, the more preferable. However, in consideration of deterioration of other characteristics, the amount is more preferably 0.1 to 0.5 times that in the standard mode or 0.01 to 30 μm.

Next, the test operation at the measurement of the excessive amount of passage from position will be explained.

The test operation at the measurement of the excessive amount of passage from position of the first arm 12 is to rotate the first arm 12 to 90° at the maximum speed, the maximum acceleration, and the maximum deceleration of the first arm 12 under the condition that a weight of 2 kg is held at the distal end of the wrist 16 (the distal end of the arm connected body) of the robot 1.

The measurement of the excessive amount of passage from position of the first arm 12 is performed by rotating the first arm 12 to 90° from the bent state at 90°. Then, as shown in FIG. 8, the amount of shift when the arm first passes the target position and shifts from the target position (the maximum amount of shift) is measured.

Further, the measurement of the excessive amount of passage from position is also performed with respect to the second arm 13, the third arm 14, the fourth arm 15, and the wrist 16 by respectively rotating them to 90° from the bent states at 90° like the first arm 12. Furthermore, the measurement of the excessive amount of passage from position is also performed with respect to the combined operation of the first arm 12 and the second arm 13 by rotating the first arm 12 and the second arm 13 to 90° from the bent states at 90° at the same time.

As described above, the robot 1 has the three operation modes of the standard mode, the fast mode, and the low-vibration mode, and thus, the single robot 1 may operate as the high-speed-specialized type that may shorten the time to reach the target position, the vibration-suppression-specialized type at deactivation that may reduce the vibration when the operation is stopped, and the compatible type that ensures compatibility between high-speed performance and vibration-suppression at deactivation.

Further, the respective gains Kpp, Kvp, Kvi, Kw, Kgp of the fast mode and the standard mode are equal, and thus, the mode may be changed from the fast mode to the standard mode and from the standard mode to the fast mode even in the operation of the robot 1. Thereby, the work efficiency may be improved.

Furthermore, the vibration of the robot 1 in the operation may be reliably suppressed.

Note that, the structure of the robot (robot main body) is not limited to that explained in the embodiment.

For example, in the embodiment, the number of rotation shafts of the robot is six, however, the number of rotation shafts of the robot includes, but is not limited to, one, two, three, four, five, seven, or more.

That is, in the embodiment, the wrist has the two arms and the number of arms of the robot is six, however, the number of arms of the robot includes, but is not limited to, one, two, three, four, five, seven, or more.

Further, in the embodiment, the robot is a single-arm robot having one arm connected body in which the adjacent arms of the arms are rotatably connected, however, the robot may be a robot having a plurality of the arm connected bodies including, but not limited to, a dual-arm robot having two arm connected bodies in which the adjacent arms of the arms are rotatably connected.

Second Embodiment

Figure 15:
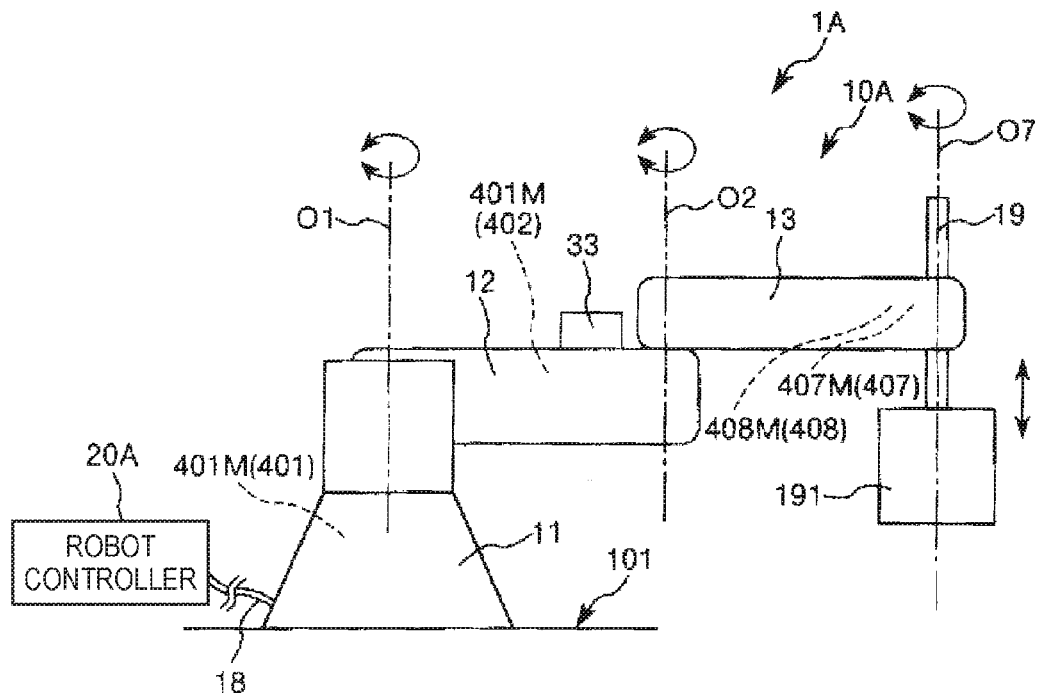
FIG. 15 is a schematic diagram showing a robot of a second embodiment of the invention.
Figure 16:
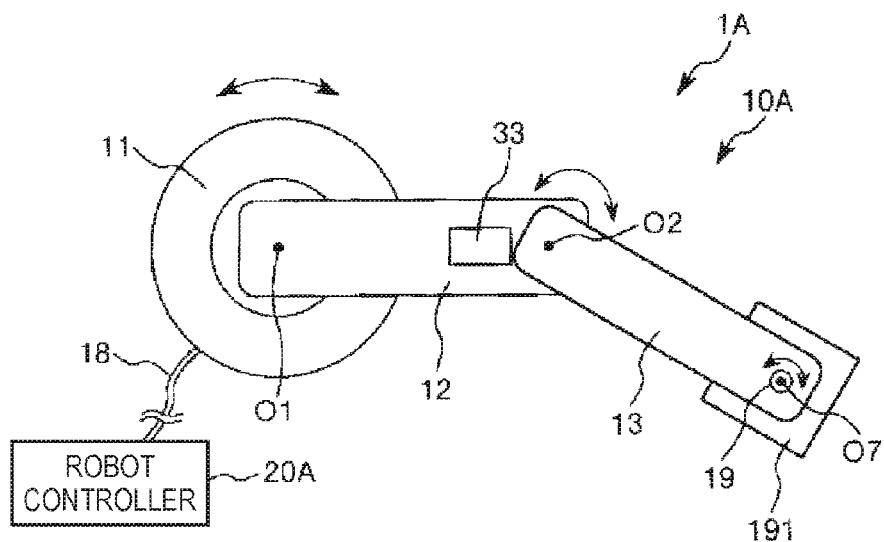
FIG. 16 is a schematic diagram of the robot shown in FIG. 15.

FIG. 15 is a schematic diagram showing a robot of the second embodiment of the invention. FIG. 16 is a schematic diagram of the robot shown in FIG. 15.

In the following, the explanation of the second embodiment will be centered on the difference from the above described first embodiment and the explanation of the same items will be omitted.

Note that for convenience of explanation, the upside in FIG. 15 is referred to as "upper" or "above" and the downside is referred to as "lower" or "below". Further, the base side in FIGS. 15 and 16 is referred to as "proximal end" and the opposite side is referred to as "distal end". Furthermore, in FIGS. 15 and 16, a robot controller 20 is shown by block diagrams, respectively. Further, in FIGS. 15 and 16, an inertia sensor 33 is shown outside of the arm 12 for making its existence clear.

A robot 1A of the second embodiment shown in FIGS. 15 and 16 is called a scalar robot.

A robot main body 10A of the robot 1A includes the base 11, two arms (links) 12, 13, a shaft (work shaft) 19, and four drive sources 401, 402, 407, 408. The base 11, the first arm 12, the second arm 13, and the shaft 19 are connected in this order from the proximal end side to the distal end side. Further, the shaft 19 has an attachment part 191 to which a functional part (end effector) is detachably attached in the lower end (distal end). Note that the shaft 19 may be regarded as arms (the third and fourth arms), i.e., arms at the most distal end.

As shown in FIGS. 15 and 16, the first arm 12, the second arm 13, and the shaft 19 are respectively supported to be independently displaceable with respect to the base 11.

The base 11 and the first arm 12 are connected via the joint 171. Further, the first arm 12 is rotatable with the first rotation shaft $O_1$ parallel to the vertical direction as the rotation center around the first rotation shaft $O_1$ with respect to the base 11. The first rotation shaft $O_1$ is aligned with the normal line of the upper surface of the floor 101 as the installation surface of the base 11. The rotation around the first rotation shaft $O_1$ is made by driving of the first drive source 401. Further, the driving (operation) of the first drive source 401 is controlled by the robot controller 20 via the motor driver 301 electrically connected to the first drive source 401 via the cable 18.

The first arm 12 and the second arm 13 are connected via the joint 172. Further, the second arm 13 is rotatable with the second rotation shaft $O_2$ parallel to the vertical direction as the rotation center around the second rotation shaft $O_2$ with respect to the first arm 12 (base 11). The second rotation shaft $O_2$ is parallel to the first rotation shaft $O_1$. The rotation around the second rotation shaft $O_2$ is made by driving of the second drive source 402. Further, the driving of the second drive source 402 is controlled by the robot controller 20 via the motor driver 302 electrically connected to the second drive source 402 via the cable 18.

The shaft 19 is connected to the proximal end (the opposite end to the base 11) of the second arm 13. In this case, the shaft 19 is provided to be rotatable with a third rotation shaft $O_7$ parallel to the vertical direction as a rotation center around the third rotation shaft $O_7$ and movable along the direction of the third rotation shaft $O_7$ with respect to the second arm 13. The third rotation shaft $O_7$ is aligned with the center axis of the shaft 19. Further, the third rotation shaft $O_7$ is parallel to the rotation shafts $O_1$, $O_2$. The movement of the shaft 19 in the direction of the third rotation shaft $O_7$ is made by driving of the third drive source 407 having a third motor 407M. Further, the driving of the third drive source 407 is controlled by the robot controller 20 via a motor driver (not shown) electrically connected to the third drive source 407 via the cable 18. Further, the rotation of the shaft 19 around the third rotation shaft $O_7$ is made by driving of the fourth drive source 404 having a fourth motor 404M. Furthermore, the driving of the fourth drive source 404 is controlled by the robot controller 20 via a motor driver (not shown) electrically connected to the fourth drive source 404 via the cable 18. Note that the third rotation shaft $O_7$ may be non-parallel to the rotation shafts $O_1$, $O_2$.

Further, like the first embodiment, an angular velocity sensor 33 is provided in the first arm 12, and the angular velocity around the first rotation shaft $O_1$ of the first arm 12 is detected by the angular velocity sensor 33.

Note that, like the first drive source 401 and the second drive source 402, a third angle sensor (not shown) is provided in the third drive source 407 and a fourth angle sensor (not shown) is provided in the fourth drive source 408. The third drive source 407, the fourth drive source 408, the third angle sensor, and the fourth angle sensor are housed within the second arm 13 and electrically connected to the controller 20.

Further, a movement support mechanism (not shown) that movably and rotatably supports the shaft 19 with respect to the second arm 13 is provided within the second arm 13. The movement support mechanism transmits the drive force of the third drive source 407 to the shaft 19 to rotate the shaft 19 around the third rotation shaft $O_7$ with respect to the second arm 13, and transmits the drive force of the fourth drive source 404 to the shaft 19 to move the shaft 19 in the direction of the third rotation shaft $O_7$ with respect to the second arm 13.

A robot controller 20A has a first drive source control unit that controls the operation of the first drive source 401, a second drive source control unit that controls the operation of the second drive source 402, a third drive source control unit that controls the operation of the third drive source 407, a fourth drive source control unit that controls the operation of the fourth drive source 408, the operation mode setting unit, and the memory unit (see FIGS. 15 and 16).

The first drive source control unit is the same as the first drive source control unit 201 of the first embodiment and the second drive source control unit, the third drive source control unit, and the fourth drive source control unit are respectively the same as the third drive source control unit 203 of the first embodiment, and their explanation will be omitted.

Note that the excessive amount of passage from position with respect to the shaft 19 is measured not only by rotating the shaft 19 around the third rotation shaft $O_7$ to 90° but also by moving the shaft 19 in the direction of the third rotation shaft $O_7$. When the excessive amount of passage from position is measured by moving the shaft 19 in the direction of the third rotation shaft $O_7$, the measurement is performed by moving the shaft 19 from the state in which the shaft 19 is located in the uppermost part to the lowermost part. Note that the first arm 12, the second arm 13, and the combination operation of the first arm 12 and the second arm 13 are respectively the same as those in the first embodiment.

According to the robot 1A, the same advantages as those of the above described first embodiment are obtained.

A robot and a robot controller have been explained with reference to the illustrated embodiments, however, the invention is not limited to those and the configurations of the respective parts may be replaced by arbitrary configurations having the same functions. Further, other arbitrary configurations may be added.

Note that, an operation mode other than the standard mode, the fast mode, or the low-vibration mode may be provided.

Further, in the embodiments, the robot controller is provided separately from the robot main body, however, the robot controller may be provided in the robot main body. In this case, the robot controller may be built in the robot main body or may be provided on the outer surface of the robot main body, for example, on the outer surface of the base or the like.

Furthermore, the motors of the respective drive sources include not only the servo motors but also stepping motors or the like, for example. In the case where a stepping motor is used as the motor, as a position sensor, for example, a sensor that detects the rotation angle of the motor by counting the number of drive pulses input to the stepping motor may be used.

Moreover, the systems of the respective position sensors and the respective angular velocity sensors are not particularly limited, but include the optical system, the magnetic system, the electromagnetic system, and the electrical system.

In addition, the robot of the invention is not limited to the arm-type robot (robot arm) or the scalar robot, but may be another type of robot including, for example, a legged walking (running) robot.

What is claimed is:

1. A robot controller for controlling a robot, the robot having a movable arm and an angular velocity sensor provided at the arm, the robot controller comprising:
   a servo circuit configured to perform vibration suppression control based on a detection result of the angular velocity sensor; and
   an operation mode setting unit that sets an operation mode of the robot, the operation mode including a first operation mode, a second operation mode prioritizing speed; and a third operation mode prioritizing vibration suppression, wherein:
   the operation mode setting unit changes a correction factor multiplied by a maximum acceleration and a maximum deceleration of the arm and a servo gain of the servo circuit, and selectively sets the operation mode as one of the first operation mode, the second operation mode in which the arm operates faster than in the first operation mode, and the third operation mode in which the arm vibrates less than in the first operation mode.

2. The robot controller according to claim 1, wherein:

in the second operation mode, the maximum acceleration of the arm is set to be 1 to 2 times that in the first operation mode, the maximum deceleration of the arm is set to be 1 to 2 times that in the first operation mode, the correction factor is set to be 0.5 to 2.5 times that in the first operation mode, the servo gain is set to be equal to that in the first operation mode, and a cycle time as a time taken when the arm performs a predetermined test operation is 90% or less than that in the first operation mode, and in the third operation mode, the maximum acceleration of the arm is set to be 0.5 to 1.5 times that in the first operation mode, the maximum deceleration of the arm is set to be 0.5 to 1.5 times that in the first operation mode, the correction factor is set to be 0.5 to 1.5 times that in the first operation mode, the servo gain is set to be 0.5 to 1.5 times that in the first operation mode, and, when the arm performs the predetermined test operation and is displaced to a target position, an excessive amount of passage from position as an amount of shift when the arm first passes the target position and shifts from the target position is 0.5 times or less than that in the first operation mode or 30 μm or less.

3. The robot controller according to claim 1, wherein a maximum acceleration and a maximum deceleration of the arm in the second operation mode are respectively larger than those in the first operation mode.

4. The robot controller according to claim 1, wherein the correction factor in the second operation mode is larger than that in the first operation mode.

5. The robot controller according to claim 1, wherein a maximum speed of the arm in the second operation mode and the first operation mode are equal.

6. The robot controller according to claim 1 wherein:

the servo circuit is configured to control a drive source of the robot by feedback of a correction component derived from the detection results of the angular velocity sensor and a position sensor, the drive source of the robot is configured to move the arm, and the position sensor detects a rotation angle of the drive source, the servo circuit sets the servo gain of the correction component to zero when movement of the arm is stopped, in the third operation mode, when the movement of the arm is stopped and the servo gain of the correction component is set to zero, a time at which the servo gain of the correction component is set to zero is earlier than that in the first operation mode.

* * * * *